United States Patent
Sahin et al.

(10) Patent No.: US 10,911,203 B2
(45) Date of Patent: Feb. 2, 2021

(54) WAVEFORM CODING WITH MODULATION FOR SINGLE-USER AND MULTIPLE-USER TRANSMISSIONS

(71) Applicant: INTERDIGITAL PATENT HOLDINGS, INC., Wilmington, DE (US)

(72) Inventors: Alphan Sahin, Westbury, NY (US); Oghenekome Oteri, San Diego, CA (US); Hanqing Lou, Syosset, NY (US); Xiaofei Wang, Cedar Grove, NJ (US); Li Hsiang Sun, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/609,976

(22) PCT Filed: Apr. 30, 2018

(86) PCT No.: PCT/US2018/030167
§ 371 (c)(1),
(2) Date: Oct. 31, 2019

(87) PCT Pub. No.: WO2018/204246
PCT Pub. Date: Nov. 8, 2018

(65) Prior Publication Data
US 2020/0059342 A1    Feb. 20, 2020

Related U.S. Application Data

(60) Provisional application No. 62/580,015, filed on Nov. 1, 2017, provisional application No. 62/500,204, filed on May 2, 2017.

(51) Int. Cl.
*H04L 5/00* (2006.01)
*H04L 27/26* (2006.01)

(52) U.S. Cl.
CPC .......... *H04L 5/0053* (2013.01); *H04L 5/0007* (2013.01); *H04L 5/0048* (2013.01); *H04L 5/0094* (2013.01); *H04L 27/2613* (2013.01)

(58) Field of Classification Search
CPC ......... H04L 5/00; H04L 27/26; H04L 5/0094; H04L 27/2613; H04L 27/2602;
(Continued)

(56) References Cited

U.S. PATENT DOCUMENTS

2020/0045635 A1* 2/2020 Lin ...................... H04W 52/12

OTHER PUBLICATIONS

Liu et al., "On Waking-Up Multiple WUR Stations," IEEE 802.11-17/0028r0 (Jan. 15, 2017) (Year: 2017).*
(Continued)

*Primary Examiner* — Kyaw Z Soe
(74) *Attorney, Agent, or Firm* — Volpe Koenig

(57) ABSTRACT

A wireless transmit/receive unit (WTRU) may be configured to perform wake up radio (WUR) for one or more WUR receivers. For example, the WTRU may transmit a common preamble to a first WUR receiver using a first frequency range. The WTRU may transmit a first WUR packet to the WUR receiver, after the common preamble. The WTRU may transmit the common preamble to a second WUR receiver using a second frequency range. The WTRU may transmit a second WUR packet after the common preamble, The bandwidth associated with the second WUR packet and the bandwidth associated with the first WUR packet may be smaller than the bandwidth associated with the common preamble, which may avoid interference from other transmitters {e.g., 802.11 transmitters, 802.11 stations, and 802.11 radios). The bandwidth associated with the first WUR packet and the bandwidth associated with the second WUR packet may not be coextensive with one another.

12 Claims, 32 Drawing Sheets

11ba multi-user: frequency method

(58) Field of Classification Search
CPC ... H04L 5/0007; H04L 5/0048; H04L 5/0053; H04W 52/0235; H04W 52/0229
See application file for complete search history.

(56) References Cited

OTHER PUBLICATIONS

Liu et al., "On Waking-Up Multiple WUR Stations," IEEE 802.11-17/0028r0 (Jan. 15, 2017) (Year: 2017) (Year: 2017).*
Agilent Technologies, "Wireless LAN and 60 GHz—IEEE 802.11ad Explained," pp. 1-28 (May 20, 2013).
Azizi et al., "A PAR Proposal for Wake-up Radio," IEEE 802.11-16/1045r9 (Nov. 2016).
Chen et al., "MAC and PHY Proposal for 802.11af," IEEE 802.11-10/0258r0 (Mar. 2010).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D1.2 (Apr. 2017).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D2.2 (Feb. 2018).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
Jia et al., "Performance Investigations on Single-carrier and Multiple-carrier-based WUR," IEEE 802.11-17/0373r1 (Mar. 2017).
Liu et al., "Efficient FDMA MU Transmission Schemes for WUR WLAN," IEEE 802.11-17/1625r2 (Oct. 10, 2017, uploaded to IEEE website on Jan. 15, 2018).
Liu et al., "On Waking-Up Multiple WUR Stations," IEEE 802.11-17/0028r0 (Jan. 15, 2017).
Park et al., "Various Symbol Types for WUR," IEEE 802.11-17/0350r0 (Mar. 2017).
Qu et al., "A Narrow-Band Bipolar OOK Signal," IEEE 802.11-17/0357r0 (Mar. 2017).
Sahin et al., "On the Coexistence of 802.11ax and 802.11ba Signals," IEEE 802.11-17/0659r3 (May 8, 2017).
Sahin et al., "OOK Waveform Coding Scheme for Frequency Domain Multiplexing," IEEE 802.11-17/1419r0 (Sep. 11, 2017).
Sahin et al., "Optimizing OOK Waveform for High Data Rate WUS," IEEE 802.11-17/1634r0 (Nov. 5, 2017).
Sahin et al., "Performance Evaluation of OOK Waveform Coding Schemes with Impairments," IEEE 802.11-17/1037r2 (Jul. 10, 2017).
Shellhammer et al., "WUR Modulation and Coding," IEEE 802.11-17/0366r0 (Mar. 2017).
Suh et al., "Waveform Generation for Waveform Coding," IEEE 802.11-17/0376r0 (Mar. 2017).
Sun et al., "IEEE 802.11 TGay Use Cases," IEEE 802.11-2015/0625r2 (May 2015).
Wei et al., "Packet Design for Wake-Up Receiver (WUR)," IEEE 802.11-17/0066r0 (Jan. 10, 2017).

* cited by examiner

FIG. 23

WAVEFORM CODING WITH MODULATION FOR SINGLE-USER AND MULTIPLE-USER TRANSMISSIONS

CROSS-REFERENCE

This application is the U.S. National Stage, under 35 U.S.C. § 371, of International Application No. PCT/US2018/030167 filed Apr. 30, 2018, which claims the benefit of U.S. Provisional Application No. 62/500,204, filed May 2, 2017 and U.S. Provisional Application No. 62/580,015, filed Nov. 1, 2017, the contents of which are incorporated by reference herein.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. In certain WLAN systems, STA to STA communication may take place. In certain WLAN systems, an AP may act in the role of a STA or vice-versa. Beamforming may be used by WLAN devices.

SUMMARY

Systems, methods, and instrumentalities are disclosed for determining a shaping sequence for a signal. The signal may comprise a wake-up radio (WUR) signal. The signal may be generated based on the shaping sequence. Generating the signal may comprise using a set of subcarriers of orthogonal frequency-division multiplexing (OFDM). Generating the signal may comprise using a discrete Fourier transform (DFT)-spread operation. A multiple shaped signal may be generated in either a time domain or a frequency domain. The generated shaped signal may be multiplexed in either the time domain or the frequency domain.

A wireless transmit/receive unit (WTRU) may be configured to perform wake up radio (WUR) for one or more WUR receivers. For example, the WTRU may transmit a common preamble to a first WUR receiver using a first frequency range. The WTRU may transmit a first WUR packet to the WUR receiver, after the common preamble. The WTRU may transmit the common preamble to a second WUR receiver using a second frequency range. The WTRU may transmit a second WUR packet after the common preamble, The bandwidth associated with the second WUR packet and the bandwidth associated with the first WUR packet may be smaller than the bandwidth associated with the common preamble, which may avoid interference from other transmitters (e.g., 802.11 transmitters, 802.11 stations, and 802.11 radios). The bandwidth associated with the first WUR packet and the bandwidth associated with the second WUR packet may not be coextensive with one another.

BRIEF DESCRIPTION OF THE DRAWINGS

FIG. 23 illustrates example multi-user (MU) WUR in coexistence with other 802.11 symbols.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
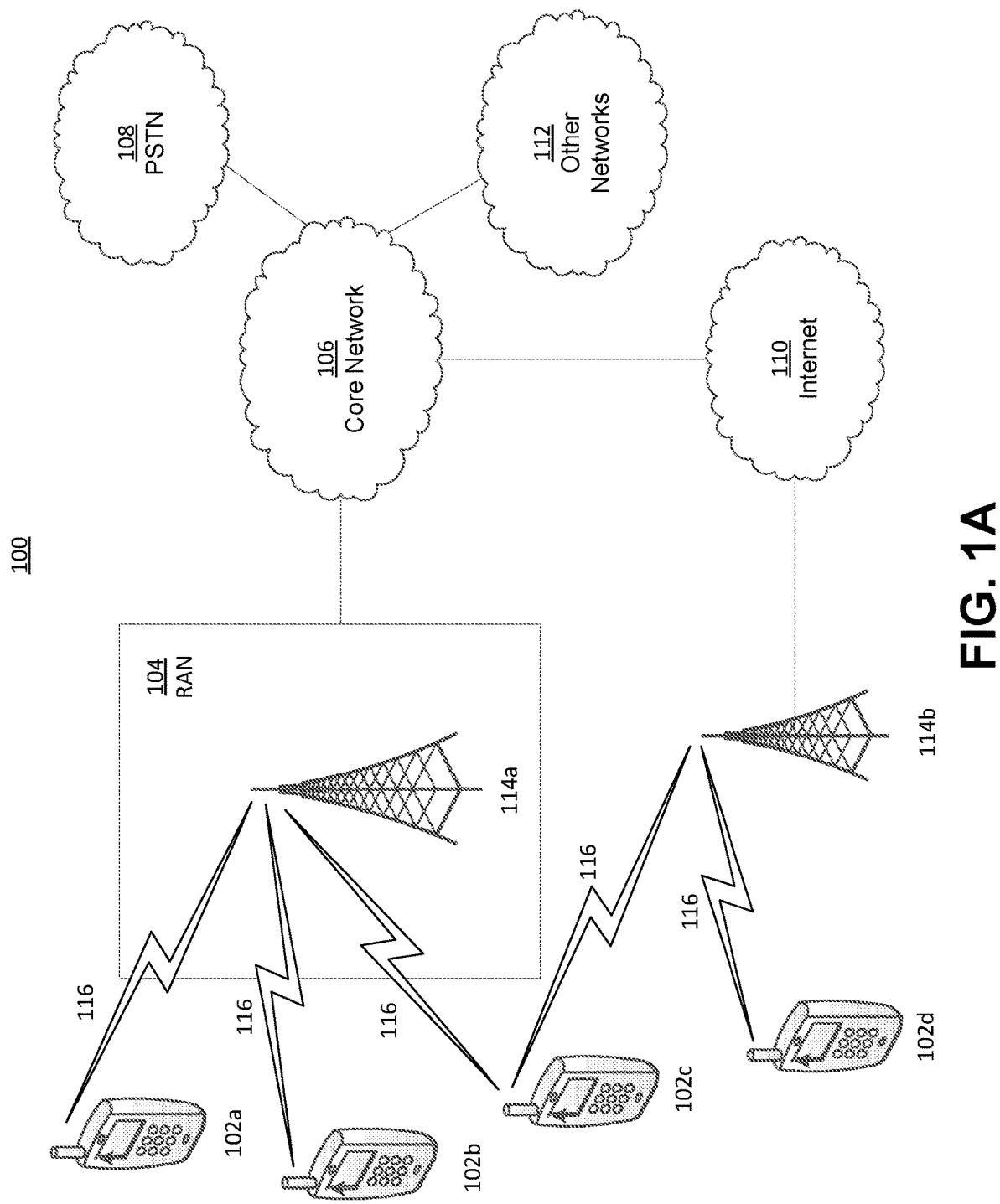
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
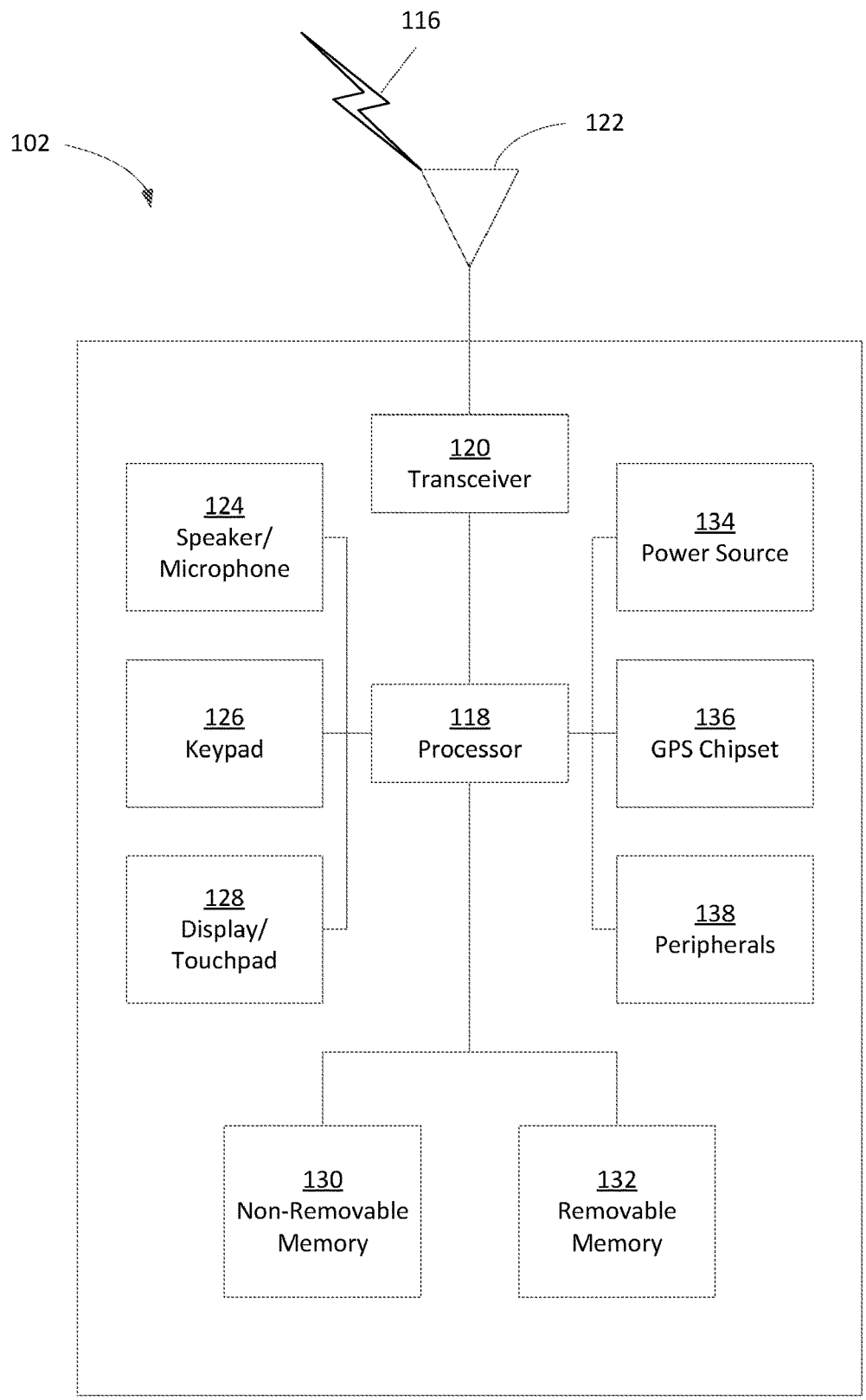
FIG. 1B is a system diagram illustrating an example wireless transmit/receive unit (WTRU) that may be used within the communications system illustrated in FIG. 1A according to an embodiment.
Figure 1C:
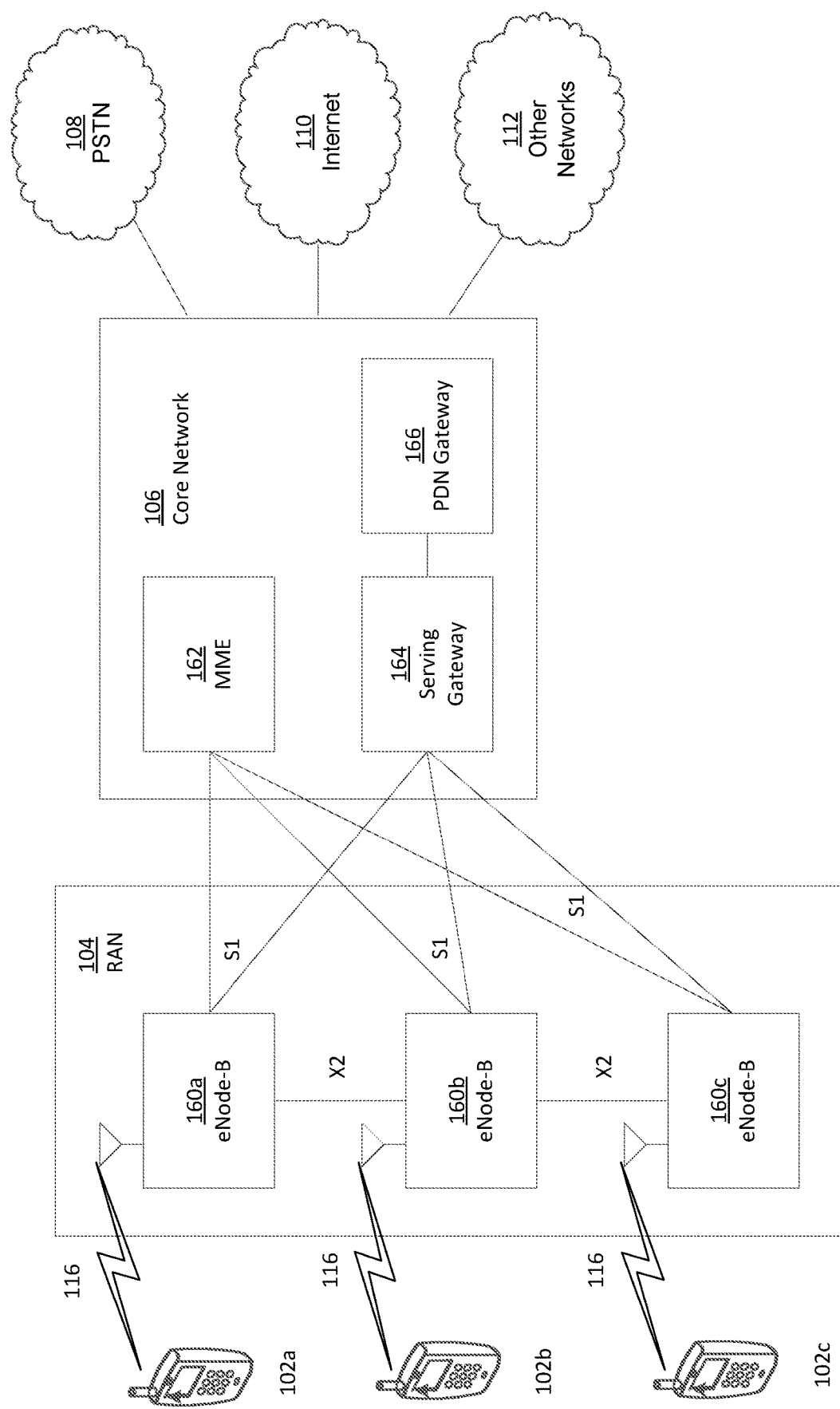
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
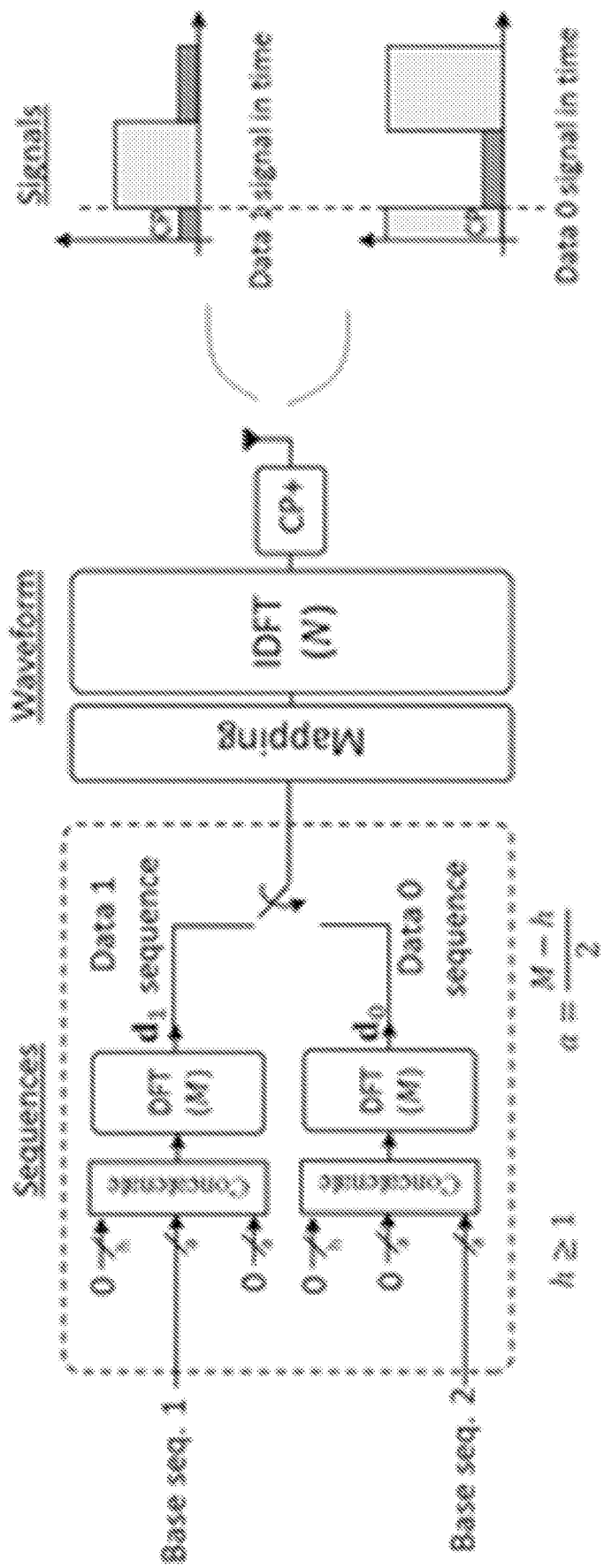
FIG. 10 illustrates an example for Manchester-coded OOK signal shape construction with DFT-spread based shaping sequences without specific CP consideration.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
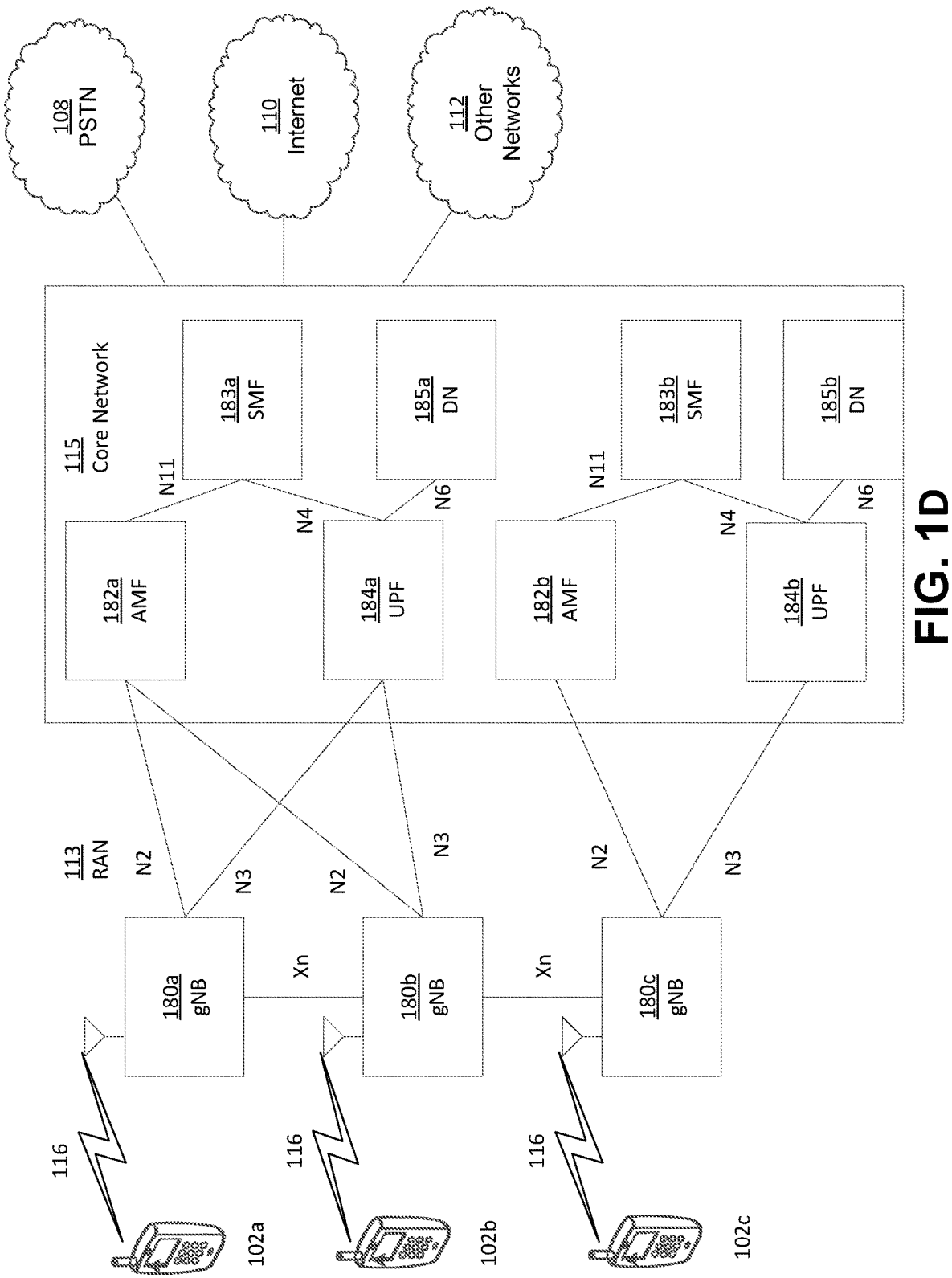
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

WLAN system may be described herein. A WLAN in Infrastructure Basic Service Set (BSS) mode may have an Access Point (AP) for the BSS and one or more stations (STAs) associated with the AP. The AP may have access or interface to a Distribution System (DS) or another type of wired and/or wireless network that carries traffic in and out of the BSS. Traffic to STAs that originates from outside the BSS may arrive through the AP and is delivered to the STAs. Traffic originating from STAs to destinations outside the BSS may be sent to the AP to be delivered to the respective destinations. Traffic between STAs within the BSS may be sent through the AP. The source STA may send traffic to the AP, and the AP may deliver the traffic to the destination STA. Such traffic between STAs within a BSS may be peer-to-peer traffic. Such peer-to-peer traffic may be sent (e.g., sent directly) between the source and destination STAs with a direct link setup (DLS) using a 802.11e DLS or a 802.11z tunneled DLS (TDLS). A WLAN using an Independent BSS (IBSS) mode may have no AP and/or STAs, communicating directly with each other. This mode of communication may be referred to as an ad-hoc mode of communication.

Using 802.11ac infrastructure mode of operation, the AP may transmit a beacon on a fixed channel, e.g., the primary channel. This channel may be 20 MHz wide and may be the operating channel of the BSS. This channel may be used by the STAs to establish a connection with the AP. One of the channel access mechanism in a 802.11 system is Carrier Sense Multiple Access with Collision Avoidance (CSMA/CA). In this mode of operation, a STA, including the AP, may sense the primary channel. If the channel is detected to be busy, the STA may back off. For example, one STA may transmit at any given time in a given BSS.

In 802.11n, High Throughput (HT) STAs may use a 40 MHz wide channel for communication. A primary 20 MHz channel may be combined with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz and 80 MHz channels may be formed by combining contiguous 20 MHz channels similar to 802.11n described herein. A 160 MHz channel may be formed either by combining 8 contiguous 20 MHz channels, or by combining two non-contiguous 80 MHz channels. Combining two non-contiguous 80 MHz channels may be referred to as a 80+80 configuration. For the 80+80 configuration, the data may be passed through a segment parser that divides it into streams (e.g., two streams) after channel encoding. IFFT and time domain processing may be done on each stream (e.g., separately). The streams may be mapped on to the channels (e.g., two channels), and the data may be transmitted. At the receiver, this mechanism may be reversed, and the combined data may be sent to the MAC.

Sub 1 GHz modes of operation may be supported by 802.11af and 802.11ah. The channel operating bandwidths and carriers may be reduced relative to the specification used in 802.11n and 802.11ac. 802.11af may support 5 MHz, 10 MHz, and 20 MHz bandwidths in the TV White Space (TVWS) spectrum. 802.11ah may support 1 MHz, 2 MHz, 4 MHz, 8 MHz, and 16 MHz bandwidths using non-TVWS spectrum. 802.11ah may support one or more Meter Type Control (MTC) device(s) in a macro coverage area. One or more MTC device(s) may have capabilities (e.g., limited capability) to support limited bandwidths. One or more MTC device(s) may include a requirement for a long battery life.

WLAN systems may support multiple channels and channel widths, such as 802.11n, 802.11ac, 802.11af, and 802.11ah. WLAN systems may include a channel which is designated as the primary channel. The primary channel may have a bandwidth equal to the largest common operating bandwidth supported by some or all STAs in the BSS. The bandwidth of the primary channel may be limited by the STA (e.g., some or all STAs in operating in a BSS), which supports the smallest bandwidth operating mode. In 802.11ah, the primary channel may be 1 MHz wide if there are STAs (e.g., MTC type devices) that support a 1 MHz mode. The STAs may exist even if the AP and other STAs in the BSS may support a 2 MHz, 4 MHz, 8 MHz, 16 MHz, or other channel bandwidth operating modes. Some or all carrier sensing and NAV settings may depend on the status of the primary channel. For example, if the primary channel is busy (e.g., due to a STA supporting a 1 MHz operating mode in transmitting to the AP), available frequency bands may be considered busy even though majority of the frequency bands may stay idle and/or available.

In the United States, the available frequency bands which may be used by 802.11ah may be from 902 MHz to 928 MHz. In Korea, the available frequency band which may be used by 802.11ah may be from 917.5 MHz to 923.5 MHz. In Japan, the available frequency band which may be used by 802.11ah may be from 916.5 MHz to 927.5 MHz. The total bandwidth available for 802.11ah may be 6 MHz to 26 MHz depending on the country code.

802.11ac has introduced a concept for downlink Multi-User MIMO (MU-MIMO) transmission to multiple STAs in the same symbol's time frame, e.g., during a downlink OFDM symbol. The use of downlink MU-MIMO for 802.11ac may be considered for 802.11ah. Downlink MU-MIMO may use the same symbol timing to multiple STAs' interference of the waveform transmissions to multiple STAs. Some or all STAs involved in MU-MIMO transmission with the AP may use the same channel or band. The use of the same channel or band may limit the operating bandwidth. The operating bandwidth may be limited to the smallest channel bandwidth that is supported by the STAs, which may be included in the MU-MIMO transmission with the AP.

802.11ba may be described herein. 802.11ba may define a physical layer specification and medium access control layer specification that enables operation of a wake-up radio (WUR) for 802.11 devices. 802.11ba may include one or more of the following: range, capability, coexistence, power consumption, or latency. For range, the 802.11ba WUR may be a companion radio to the primary connectivity radio (e.g., 802.11ax) and may meet the same range requirement as the primary connectivity radio. For capability, the wake-up frames may carry control information which can trigger a transition of the primary connectivity radio out of sleep. For coexistence, the WUR devices may coexist with legacy IEEE 802.11 devices in the same band. For power consumption, the WUR may have an expected active receiver power consumption of less than one milliwatt. Low power devices may manifest in applications and Internet-of-Things (IoT) usage cases. These usage cases may include, but not limited to healthcare, smart home, industrial sensors, wearables, etc. Devices used in these applications may be powered by a battery. For latency, prolonging the battery lifetime, while in some usage cases, maintaining low latency may become a requirement. Power efficient mechanisms may be used with battery-operated devices while maintaining low latency where it is needed. A typical OFDM active receiver may consume tens to hundreds of milliwatts. To reduce power consumption, devices may use power save modes. Devices based on the IEEE 802.11 power save modes may wake up (e.g., wake up periodically) from a sleep state to receive information from an access point (AP) and to know if there are data to receive from the AP. The longer the devices stay in the sleep state, the lower power the devices may consume but at the expense of increased latency of data reception.

Physical (PHY) aspects may be described herein. 802.11ba may adopt a non-coherent transmission scheme (e.g., rather than advanced schemes like OFDM). 802.11ba may adopt a non-coherent transmission scheme due to the low-power requirements of WUR. On-off keying (OOK) with waveform coding (WFC) may be a candidate for 802.11ba WUR. One of the WFC methods may be Manchester coding where a bit is represented with both on and off states at different durations. The Manchester coding may allow the receiver to detect bit by comparing the amplitude on "on" and "off" durations. Unlike the receiver structure, the transmitter for 802.11ba can be advanced as the signal is going to be generated by a 802.11 AP. An OFDM structure may be used in different ways to generate the OOK symbols.

Figure 2:
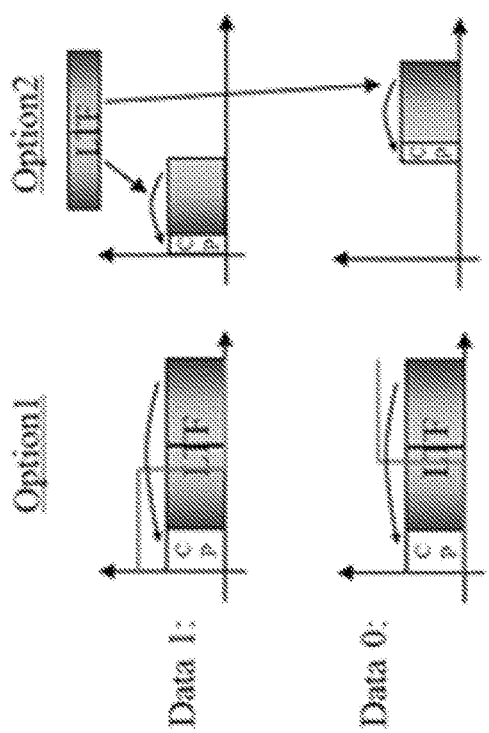
FIG. 2 illustrates example masking of orthogonal frequency-division multiplexing (OFDM) symbols for 802.11n.
Figure 2:
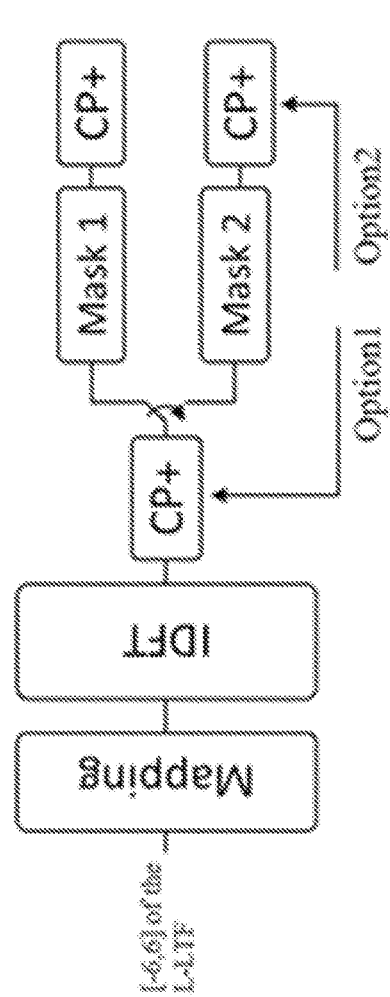

Certain WFC approaches may apply a mask on the basic OFDM symbol to represent OOK bit "0" and "1" as shown in FIG. 2. For example, FIG. 2 illustrates example masking of OFDM symbols, e.g., for 802.11n. A sequence (e.g., a part of legacy long training field (L-LTF) sequence) may be used to generate OFDM symbol. The generated OFDM symbol may be masked after cyclic prefix (CP) insertion. The generated OFDM symbol may be masked before CP insertion to generate WFC coded OOK symbols. Masking may cause adjacent channel interference and may harm the transmission in the coexistence scenarios.

Figure 3:
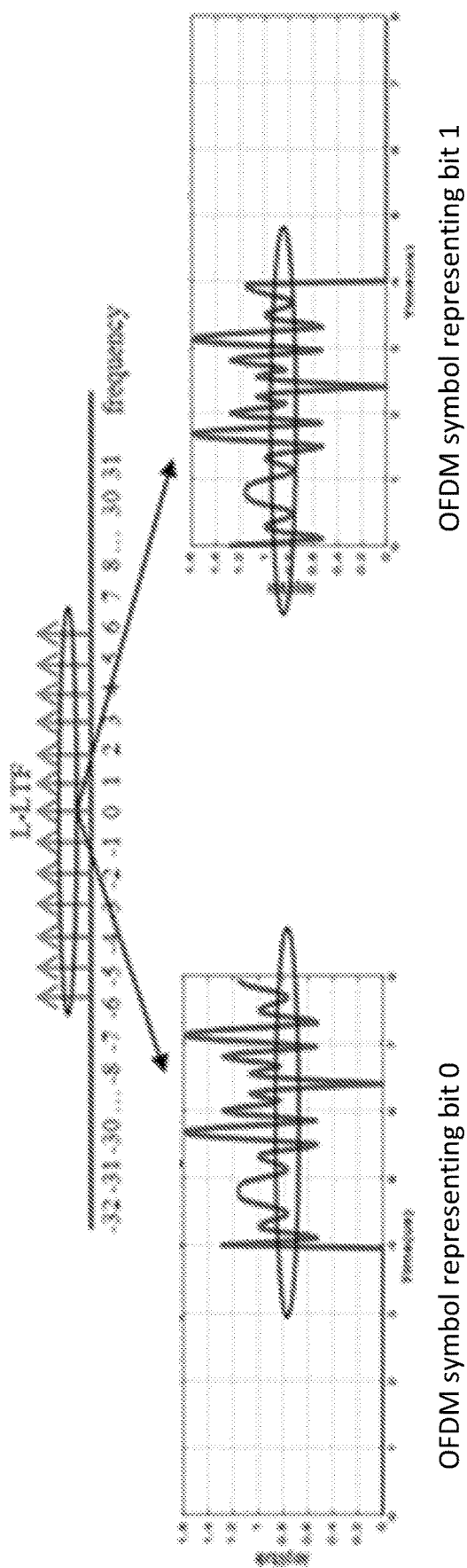
FIG. 3 illustrates example of two-symbol OFDM for on-off keying (OOK) symbol.

Two OFDM symbols may be considered to generate WFC OOK symbols. FIG. 3 illustrates example of two-symbol OFDM for OOK symbol. As shown in FIG. 3, a part of L-LTF may be using certain subcarriers of OFDM (e.g., −6:6). In FIG. 3, if the first symbol is generated with L-LTF and the second symbol is zero, the OOK symbol may correspond bit 1. If the second symbol is generated with L-LTF and the first symbol is zero, the OOK symbol corresponds bit 0. N OFDM symbol duration may be considered to generate OOK symbols (e.g., to generalize by introducing additional repetitions). This method may reduce the data rate of WUR.

Figure 4:
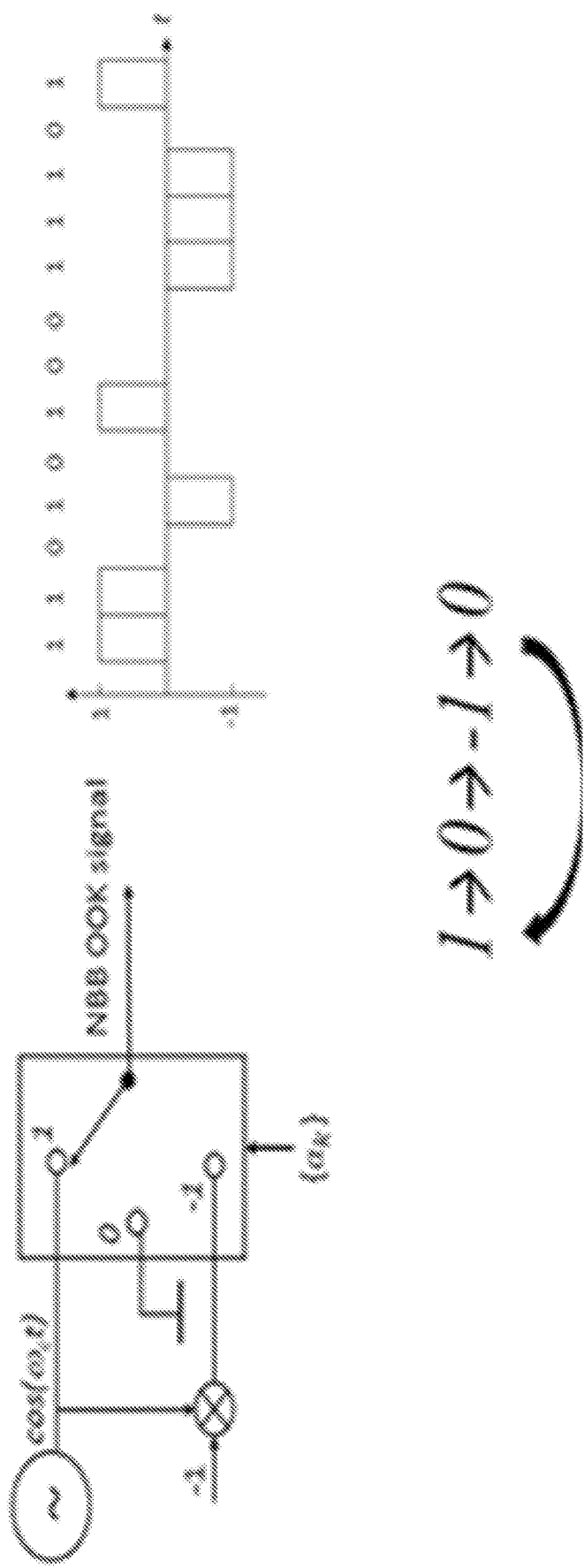
FIG. 4 illustrates an example non-OFDM based approach.

A narrowband bipolar OOK signal generation may be introduced to 802.11ba. FIG. 4 illustrates an example non-OFDM based approach. The carrier frequency may be modulated by allowing bi-polar transmitted signal structure.

Figure 5:
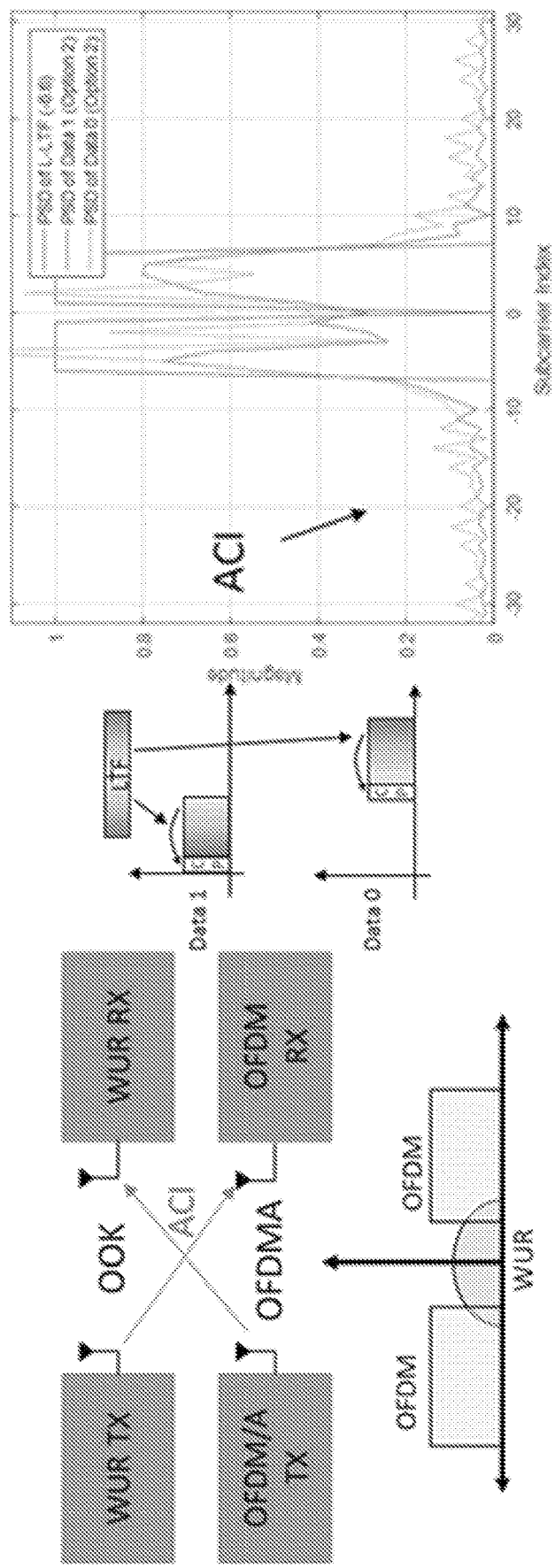
FIG. 5 illustrates example interference of other subcarriers due to masking OFDM symbols.

Interference may be caused due to OOK symbols based on masked OFDM. On-off keying (OOK) with waveform coding (WFC) may be a PHY design, e.g., for 802.11ba WUR. The approaches described herein (e.g., masking part of each OFDM symbol to generate waveform coded OOK symbol) may cause interference to other subcarriers and may harm transmission operating in adjacent subcarriers. FIG. 5 illustrates example interference of other subcarriers due to masking OFDM symbols. For example, as shown in FIG. 5, a frequency response of an OOK signal may be provided. OOK symbol may be generated by masking an OFDM symbol generated by modulating a set of subcarriers with a part of L-LTF sequence. As shown in FIG. 5, the energy of OOK symbols may cause interference to adjacent subcarriers.

Figure 6:
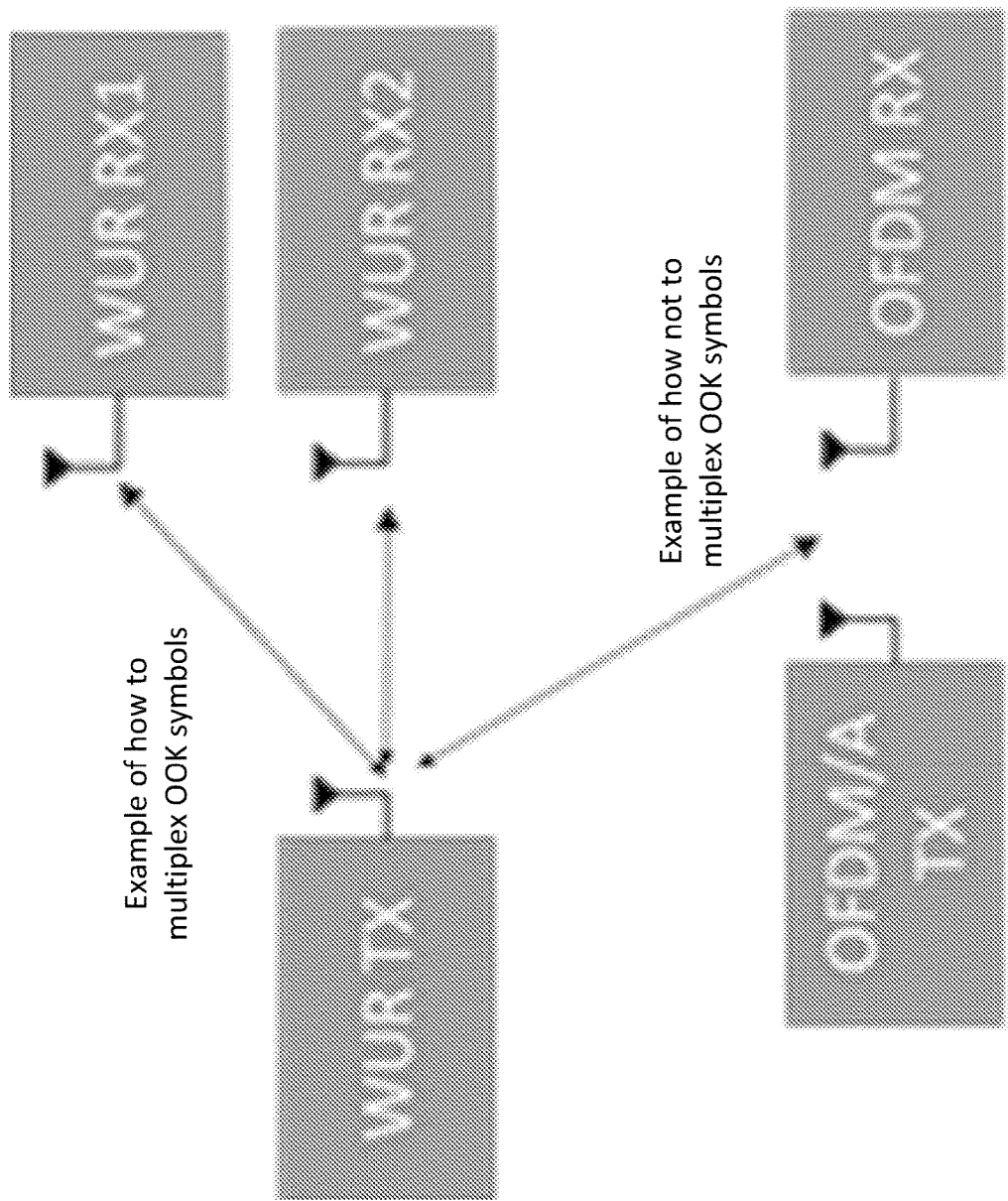
FIG. 6 illustrates an example coexistence for multi-user wake-up radio (WUR).

Multiplexing OOK symbols in multi-user scenarios may be described herein. Certain multiplexing operations (e.g., time division multiplexed (TDMed) and/or frequency division multiplexed (FDMed) of OOK symbols) may not consider other radios operating in the same environment with OFDM-based waveforms. Multiplexing OOK symbols for different users in time or frequency while maintaining the orthogonality between OOK symbols and the quadrature amplitude modulation (QAM) symbols for OFDM users may need to be considered. The OOK symbols may be spread across the frequency domain. For example, FIG. 6 illustrates exemplary coexistence considerations for multi-user WUR implementation. Implementations may be provided that may maintain multiplexing between WUR data and may address coexistence between other OFDM-based systems.

Implementations that address issues related to MU scenarios, e.g., preamble design, backward compatibility with the existing devices in the environment, and/or length, may be provided.

Figure 7:
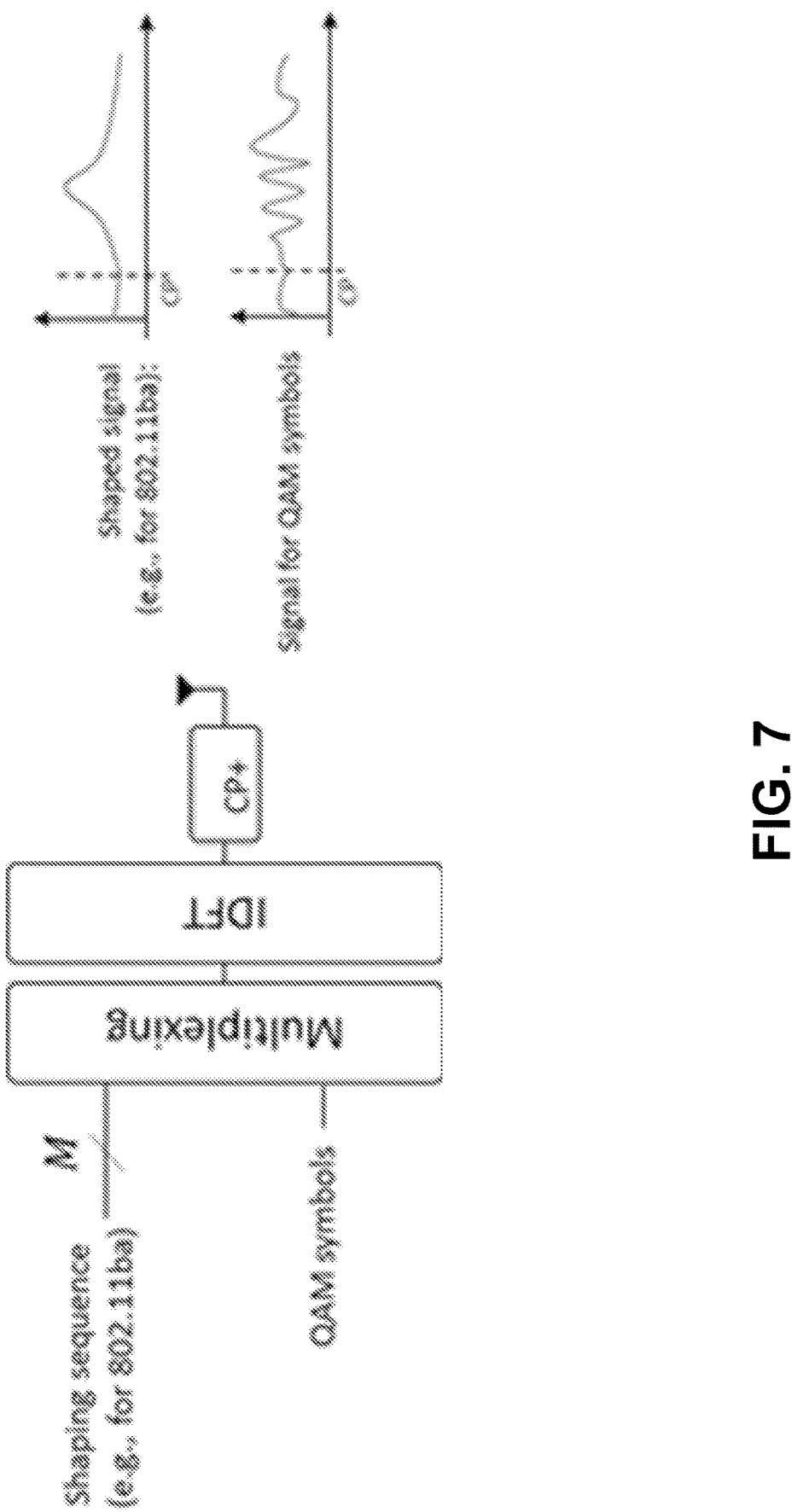
FIG. 7 illustrates an example shaping sequence for OFDM.

Shaping sequence features for OFDM may be described herein. The desired signal shape for WUR may be generated by using a set of subcarriers of an OFDM scheme. FIG. 7 illustrates an example shaping sequence for OFDM. As shown in FIG. 7, the shaped signal (e.g., WUR signal) may be generated by using M subcarriers of OFDM symbols. WUR signal may be orthogonal to the signal for QAM symbols. The shaping sequence and data symbols (e.g., QAM symbol) may be multiplexed in the frequency domain. Detection and/or demodulation of the WUR signal may be done in frequency domain at receiver. The WUR signal and other data symbols may not suffer from adjacent channel interference (ACI). One or more of the following may be performed. k different shaping sequences may be defined to generate k different shaped signals in time domain. Each shaping sequence may represent different data symbols for WUR. The location of shaping sequences may not use the same subcarriers. The same sequence may be used at different subcarriers to generate different shaped signals. The shaping sequence may yield a shaped signal that resembles a set of OOK symbols. The shaping sequence may yield a shaped signal that resembles a set of OOK symbols with Manchester coding. A desired signal shape may be obtained (e.g., obtained first). An approximation of the desired signal shape may be generated by using certain columns of inverse discrete Fourier transform (IDFT) matrix. For example, the generation (e.g., calculation) may be based on least squares or regularized least squares method. The calculation may be based on the columns that may correspond to M adjacent columns of IDFT matrix.

Discrete Fourier transform (DFT)-based shaping sequences may be described herein. The shaping sequences may be generated by using a DFT-spread operation before the OFDM transmission. The shaping sequences may be generated by mapping a set of base sequences to one or more different inputs of DFT-spread blocks. The shaping sequences may include complex phase rotation and/or windowing in frequency. An additional set of sequences associated with the base sequences may be generated and/or may be prepended to the base sequences. A shaped signal may be formed in time via a shaping helper block. The shaping helper block may be a suppression block which may generate a sequence that suppresses some part of the signal in time domain.

Figure 8:
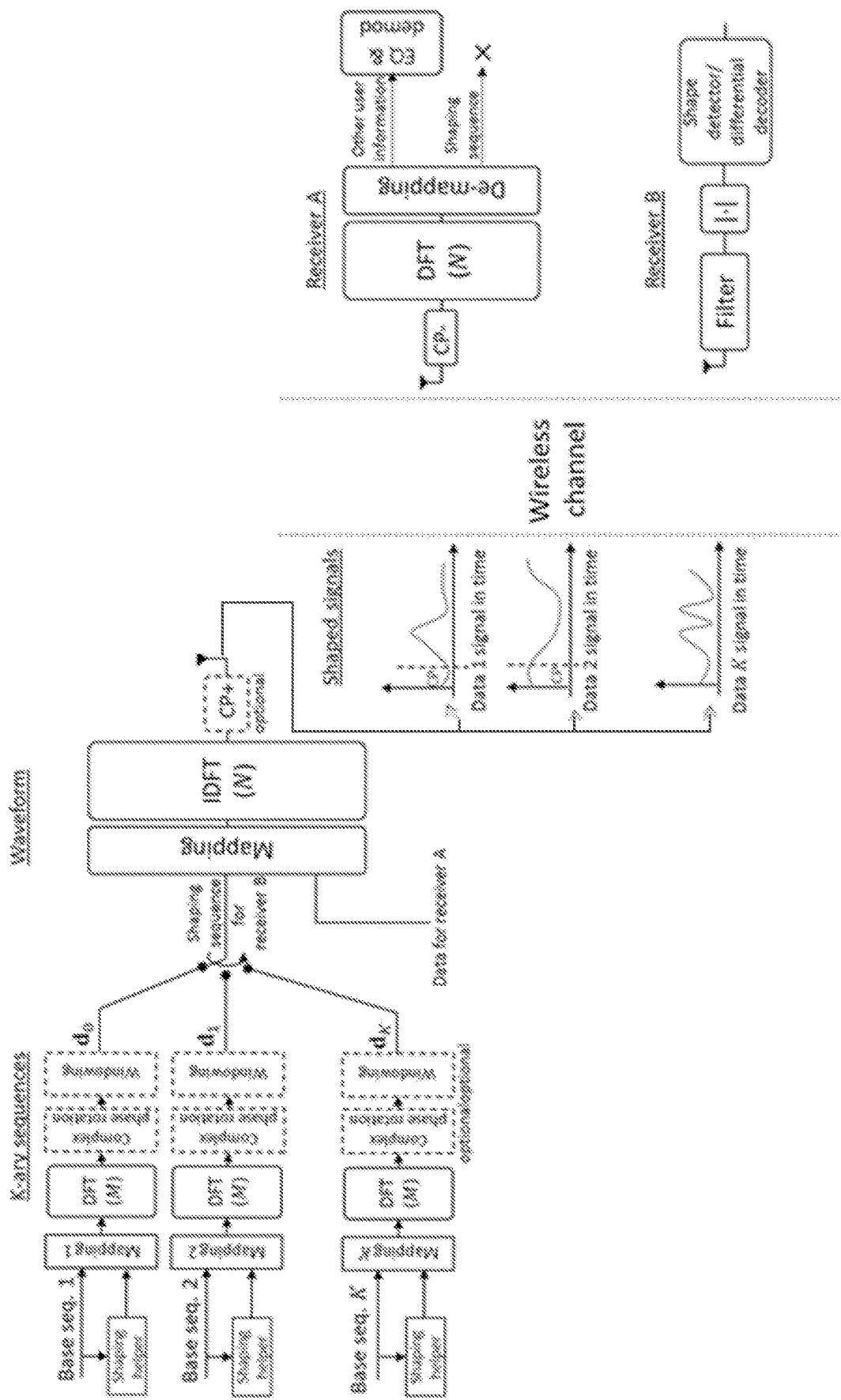
FIG. 8 illustrates an example discrete Fourier transform (DFT)-spread based shaping sequences and multiplexing the shaping sequences and data in OFDM transmission.

FIG. 8 illustrates an example DFT-spread based shaping sequences and multiplexing the shaping sequences and data in OFDM transmission. One or more following may apply. k different base sequences may be defined to generate k different shaping sequences. Each base sequence may yield k different shaping sequences that may represent different information or a combination of bit 0 and bit 1. An OFDM transmitter (e.g., OFDM transmitting device) may choose the shaping sequences to generate a desired shaped signal in the time domain. The OFDM transmitter may use a plurality of shaping sequences and data symbols (e.g., QAM symbols) in the frequency domain, e.g., to have orthogonality between signals for different receivers. The OFDM transmitter may map different shaping sequences to different sets of subcarriers, and the mapping may include interleaved and/or localized mapping options. The base sequences (e.g., the k different base sequences) may be orthogonal to other base sequences, e.g., other base sequences mapped to the input of DFTs. The base sequences after mapping may be orthogonal to each other. The shaping sequence may yield a shaped signal in time that may resemble OOK symbols. The shaping sequence may yield a shaped signal in time that may resemble OOK symbols with Manchester coding. The size of DFT-spread and corresponding mapping operation may be unique to each base sequence. Complex phase rotation (e.g., at the complex phase rotation block) may be applied to adjust the shape of the signal in time, e.g., by using a circular shift operation. Frequency domain windowing may be applied (e.g., to enhance the shaping performance). Frequency domain windowing may be applied, e.g., by repeating the output of DFT-spread and masking the repeated output with a windowing function. A CP may be added to OFDM symbols. If a CP is not used, a unique word (UW) based method may be used. The first $M_h$ and the last Mt inputs of DFT-spread block may be allocated for unique word sequence, e.g., to enable UW-based approaches. The rest of the inputs may be used for shaping sequence. The DFT-spread sequences may be pre-generated, stored, and/or used via a WUR symbol to sequence mapping function.

In implementations (e.g., as described herein), the receiver for data symbols may use an OFDM receiver. The receiver for shaped signal (e.g., 802.11ba WUR) may detect the shape of the signal (e.g., in certain bandwidth) by employing a band pass filter, envelope extractor, and/or correlator.

Figure 9:
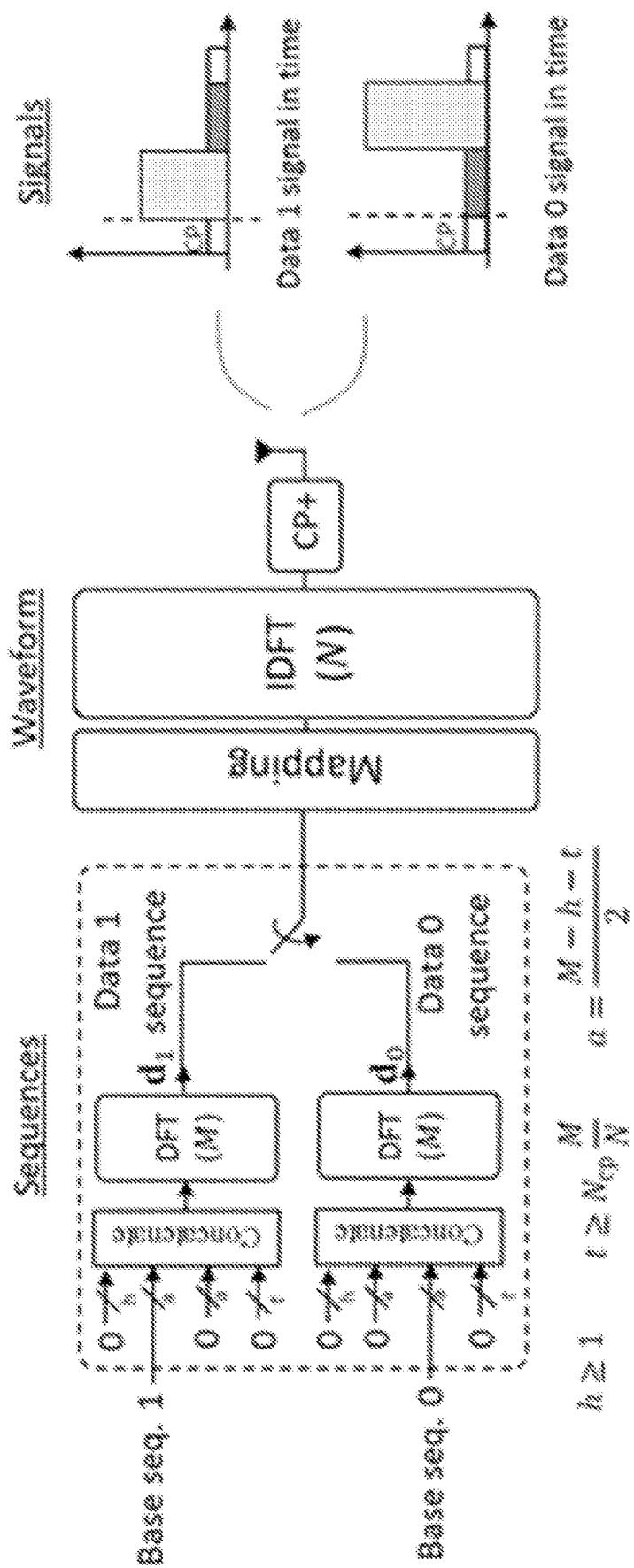
FIG. 9 illustrates an example for Manchester-coded OOK signal construction with DFT-spread based shaping sequences for low power cyclic prefix (CP).

FIG. 9 illustrates an example for Manchester-coded OOK signal construction with DFT-spread based shaping sequences for low power CP. In FIG. 9, data 1 sequence $d_1$ (e.g., the sequence representing bit '1') and data 0 sequence $d_0$ (e.g., the sequence representing bit '0') may be generated as $$d_1 = D \begin{bmatrix} 0_{h \times 1} \\ s_{base1} \\ 0_{a \times 1} \\ 0_{t \times 1} \end{bmatrix}$$

and $$d_0 = D \begin{bmatrix} 0_{h \times 1} \\ 0_{a \times 1} \\ s_{base0} \\ 0_{t \times 1} \end{bmatrix}$$

respectively. $s_{base1} \in \mathbb{C}^{a \times 1}$ and $s_{base0} \in \mathbb{C}^{a \times 1}$ may be the base sequences for data 1 and data 0. D may be the DFT matrix of size of M, and $0_{m \times n}$ may represent the zero matrix with m rows and n columns. h, a, and t may be integers. In FIG. 9, $$h \geq 1, t \geq \frac{N_{cp}M}{N}, \text{ and } a = \frac{M - h - t}{2},$$

where $N_{cp}$ may be the number samples for CP, and N may be the number of samples in OFDM symbol (e.g., IDFT size). The corresponding signals for data 1 and data 0 may be illustrated in FIG. 9. Because of the selection of h and t, the CP duration may have lower energy for data 1 and/or data 0. $s_{base0}$ may be equal to $s_{base0}$.

FIG. 10 illustrates an example for Manchester-coded OOK signal shape construction with DFT-spread based shaping sequences without specific CP consideration. For example, data 1 sequence $d_1$ and data 0 sequence $d_0$ may be generated as $$d_1 = D \begin{bmatrix} 0_{h \times 1} \\ s_{base1} \\ 0_{a \times 1} \end{bmatrix}$$

and $$d_0 = D \begin{bmatrix} 0_{h \times 1} \\ 0_{a \times 1} \\ s_{base0} \end{bmatrix}$$

respectively, where $$h \geq 1, \text{ and } a = \frac{M-h}{2},$$

and M may be the DFT size. The corresponding signal envelope may be illustrated in FIG. 10. As shown in FIG. 10, some energy may be allocated for some of the shaped signal, e.g., data 0 in FIG. 10.

Figure 11:
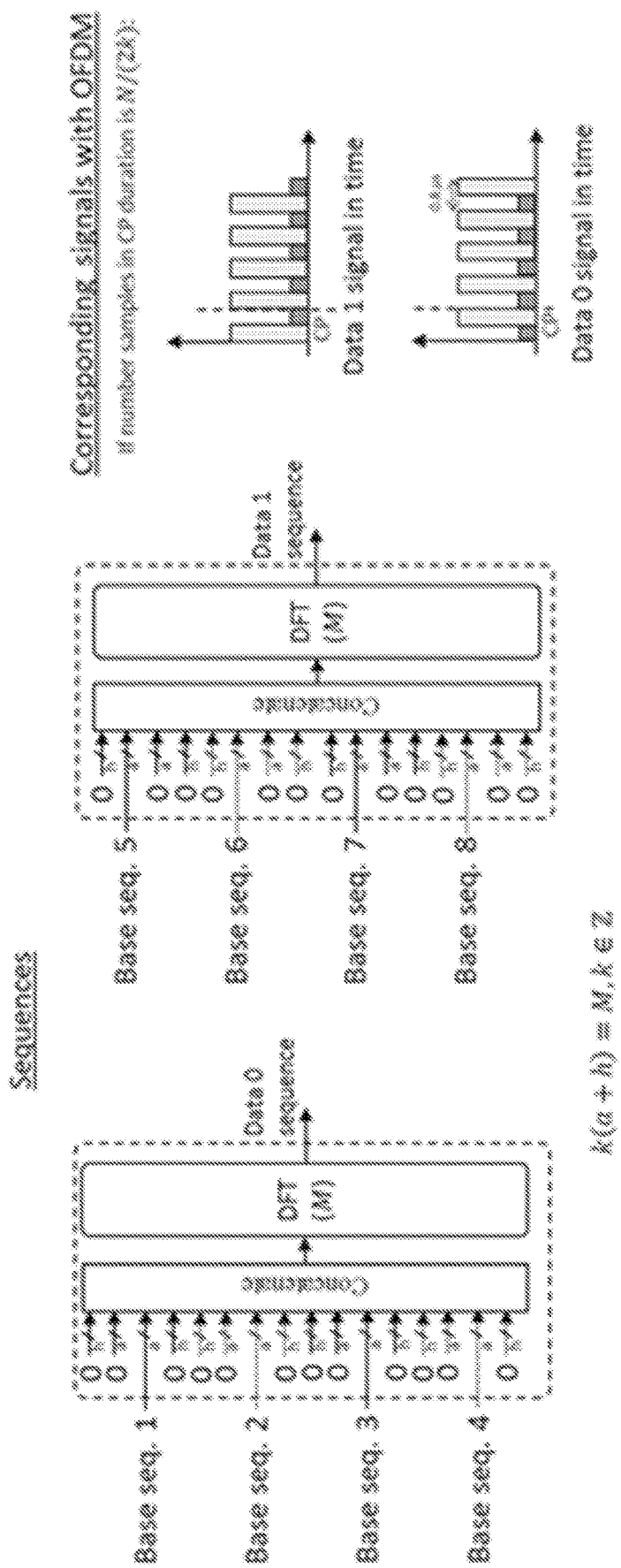
FIG. 11 illustrates an example for Manchester-coded OOK signal shape construction with DFT-spread based shaping sequences with CP consideration.

FIG. 11 illustrates an example for Manchester-coded OOK signal shape construction with DFT-spread based shaping sequences with CP consideration. The number of CP samples $N_{cp}$ may be equal to N/4. The data 1 sequence $d_1$ and the data 0 sequence $d_0$ may be generated as $$d_1 = D \begin{bmatrix} 0_{h \times 1} \\ s_{base1} \\ 0_{a \times 1} \\ 0_{h \times 1} \\ 0_{h \times 1} \\ s_{base2} \\ 0_{a \times 1} \\ 0_{h \times 1} \\ 0_{h \times 1} \\ s_{base3} \\ 0_{a \times 1} \\ 0_{h \times 1} \\ 0_{h \times 1} \\ s_{base4} \\ 0_{a \times 1} \\ 0_{h \times 1} \end{bmatrix}$$

and $$d_0 = D \begin{bmatrix} 0_{h \times 1} \\ 0_{a \times 1} \\ s_{base5} \\ 0_{h \times 1} \\ 0_{h \times 1} \\ 0_{a \times 1} \\ s_{base6} \\ 0_{h \times 1} \\ 0_{h \times 1} \\ 0_{a \times 1} \\ s_{base7} \\ 0_{h \times 1} \\ 0_{h \times 1} \\ 0_{a \times 1} \\ s_{base8} \\ 0_{h \times 1} \end{bmatrix}$$

respectively, where $s_{base1}, s_{base2}, \ldots, s_{base8} \in \mathbb{C}^{a \times 1}$ may be the base sequences. The corresponding signals in time may be given in FIG. 11. The sequence at the input of DFT may repeat one or more times (e.g., 4 times). The signal in time may repeat one or more times (e.g., 4 times). Since $N_{cp} = N/4$, 5 repetitions may occur.

Direct OOK may be used. For example, quantized alphabet in frequency for Manchester-coded OOK symbols in time may be used as described herein.

In examples, sequences that may give shapes (e.g., the shape may be calculated based on the absolute, real, or imaginary part of the time domain signal) similar to Manchester-coded OOK symbols (e.g., or any desired shape/coding in time) after an IDFT operation may include M-ary QAM (M-QAM) and/or M-ary PSK (M-PSK) symbols and/or may include zeroes to address direct current (DC) tones. For example, the length of the sequence may be 13. The 7$^{th}$ element of the sequence may be zero or null symbol. The rest of the elements may be determined based on 64-QAM constellation or 64-PSK constellation.

Figure 12:
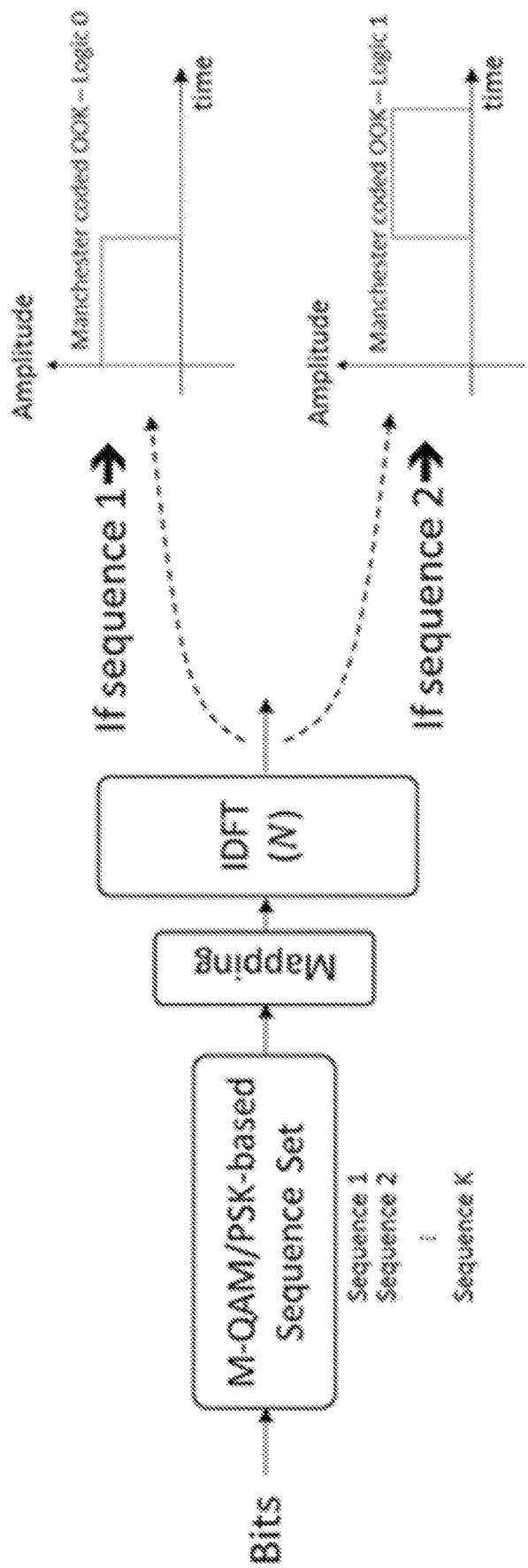
FIG. 12 illustrates an example diagram for direct OOK using quantized alphabet in frequency.

FIG. 12 illustrates an example diagram for direct OOK symbol generation using a quantized alphabet in the frequency domain. As shown in FIG. 12, K sequences may be determined, and the sequence may include the elements of a constellation, e.g., M-QAM M-PSK, and zero symbols. The information bits may be mapped to the sequences. For example, sequence 1 may represent bit 1, and sequence 2 may represents bit 0. If bit 1 is be transmitted, the elements of sequence 1 may be mapped to subcarriers, and the IDFT of mapped sequence 1 may be calculated. At the output of IDFT, the desired shape may be obtained. For example, the shape may be similar to Manchester coded OOK symbols. A guard internal or cyclic prefix/postfix may be attached to the output of IDFT (e.g., attached before transmission).

The sequences may carry one or more different information bits, e.g., bit 1 and bit 0. The sequences which carry different information bits may be different (e.g., completely different) or derived from each other (e.g., which may reduce the complexity of the hardware). For example, one or more of the following example sequences may be used: sequence for bit 1 or bit 0 may be the conjugate of each other; sequence for bit 1 may be the order-wise reverse of the sequence for bit 0; and/or sequence for bit 1 may be the modulated version of the sequence for bit 0.

In examples, the sequence for bit 1 or bit 0 may be the conjugate of each other, e.g., $s_{bit1} = \{a_0, a_1, \ldots, a_{12}\}$ and $s_{bit0} = \{a_0^*, a_1^*, \ldots, a_{12}^*\}$. The corresponding shape obtained after IDFT of the logic 1 sequence in the time domain may be flipped to derive the shape for logic 0. The Manchester coded OOK symbols for bit 1 and bit 0 may be generated by using the same base sequence. In this example, $x(n) = y^*(-n)$ may be exploited when $x(n) = \text{IDFT}(X(k))$ and $y(n) = \text{IDFT}(X^*(k))$ and $k = 0, 1, \ldots, N-1$ and $n = 0, 1, \ldots, N-1$.

In examples, the sequence for bit 1 may be the order-wise reverse of the sequence for bit 0, e.g., $s_{bit1} = \{a_0, a_1, \ldots, a_{12}\}$ and $s_{bit0} = \{a_{12}, a_{11}, \ldots, a_0\}$. Similar to conjugation example described herein, the corresponding shape obtained after IDFT of the sequence of logic 1 in the time domain may be flipped for logic 0. The Manchester coded OOK symbols for bit 1 and bit 0 may be generated by using the same base sequence. In this example, $x(n) = y(-n)$ may be exploited when $x(n) = \text{IDFT}(X(k))$ and $y(n) = \text{IDFT}(X(-k))$ and $k = 0, 1, \ldots, N-1$ and $n = 0, 1, \ldots, N-1$.

In examples, the sequence for bit 1 may be the modulated version of the sequence for bit 0, e.g., $$s_{bit1} = \{a_0, a_1, \ldots, a_{12}\} \text{ and}$$

$$s_{bit0} = \{a_0, a_1, \ldots, a_{12}\} \odot \{e^{j2\pi \frac{S}{64} \times 0}, e^{j2\pi \frac{S}{64} \times 1}, \ldots, e^{j2\pi \frac{S}{64} \times 13}\},$$

where $\odot$ is the point-to-point multiplication. This operation may shift (e.g., cyclically shift) the original sequence in time domain by S and it may generate the Manchester coded OOK symbols.

In examples, Manchester coded OOK symbols in time may be generated with Direct OOK approach. For example, the sequences of length 13 may be {alphabet$_{M\text{-}QAM}$(i$_{left}$), 0, alphabet$_{M\text{-}QAM}$(i$_{right}$)}, where alphabet$_{M\text{-}QAM}$(•) may be the ordered set of the constellation points of M-QAM, and i$_{left}$ and i$_{right}$ may be the indices (e.g., given in the lists, such as 127, 128, and/or 129) to generate the sequences. The sequences may be optimized based on different criterion. In examples, the summation of the elements of the sequences may be equal to zero, e.g., to improve the out of band (OOB) characteristics of the sequence (e.g., OOB first). In examples, the fluctuation in the on duration of the corresponding Manchester coded OOK symbols may be minimized (e.g., peak to average power ratio (PAPR) first). In examples, the energy in the off duration of Manchester coded OOK symbols may be minimized (e.g., Leakage first). Based on one or more of the types described herein, the following sequences and/or their flipped version may be transmitted comprising information which represents one of bit 1 or bit 0.

In examples, sequences based on 16QAM may be provided as follows:

sequence={alphabet$_{M\text{-}QAM}$(i$_{left}$),0,alphabet$_{M\text{-}QAM}$(i$_{right}$)}

Figure 13:
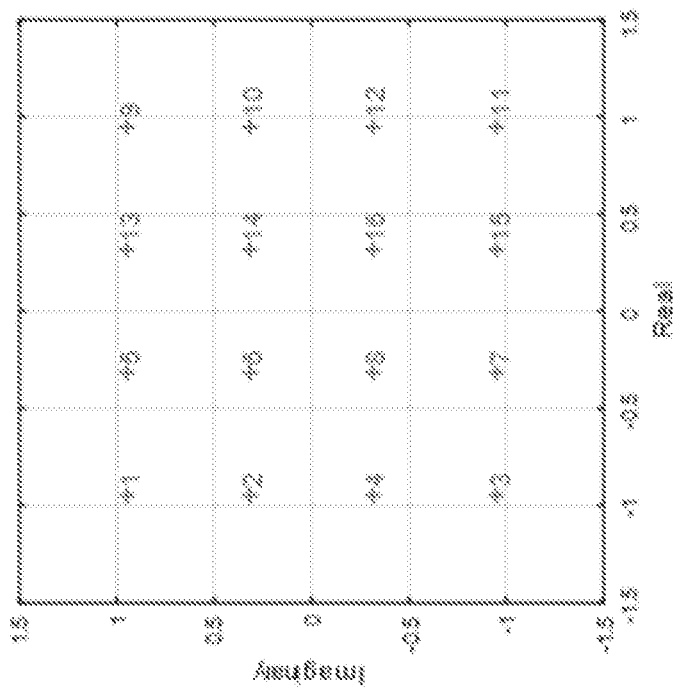
FIG. 13 illustrates example indices for 16 quadrature amplitude modulation (QAM).

| Sequence Type | i$_{left}$ | i$_{right}$ |
|---|---|---|
| OOB First | 6 13 12 4 9 15 | 15 3 4 1 9 16 |
| PAPR First | 6 10 11 15 3 2 | 2 9 7 1 10 16 |
| Leakage First | 16 4 1 13 9 11 | 12 3 13 11 4 6 | alphabet$_{16QAM}$(n)=normalization factor×(a(n)+$\sqrt{-1}$b(n))

where the normalization factor may normalize the energy of the constellation, and a(n) and b(n) may be given in Table 1, and the index mapping is shown in FIG. 13.

TABLE 1

Real and imaginary part of unnormalized 16QAM constellation.

| n | a(n) | b(n) |
|---|---|---|
| 1 | −3 | 3 |
| 2 | −3 | 1 |
| 3 | −3 | −3 |
| 4 | −3 | −1 |
| 5 | −1 | 3 |
| 6 | −1 | 1 |
| 7 | −1 | −3 |
| 8 | −1 | −1 |
| 9 | 3 | 3 |
| 10 | 3 | 1 |
| 11 | 3 | −3 |
| 12 | 3 | −1 |
| 13 | 1 | 3 |
| 14 | 1 | 1 |
| 15 | 1 | −3 |
| 16 | 1 | −1 |

In examples, sequences based on 64QAM may be provided as follows:

sequence={alphabet$_{M\text{-}QAM}$(i$_{left}$),0,alphabet$_{M\text{-}QAM}$(i$_{right}$)}

Figure 14:
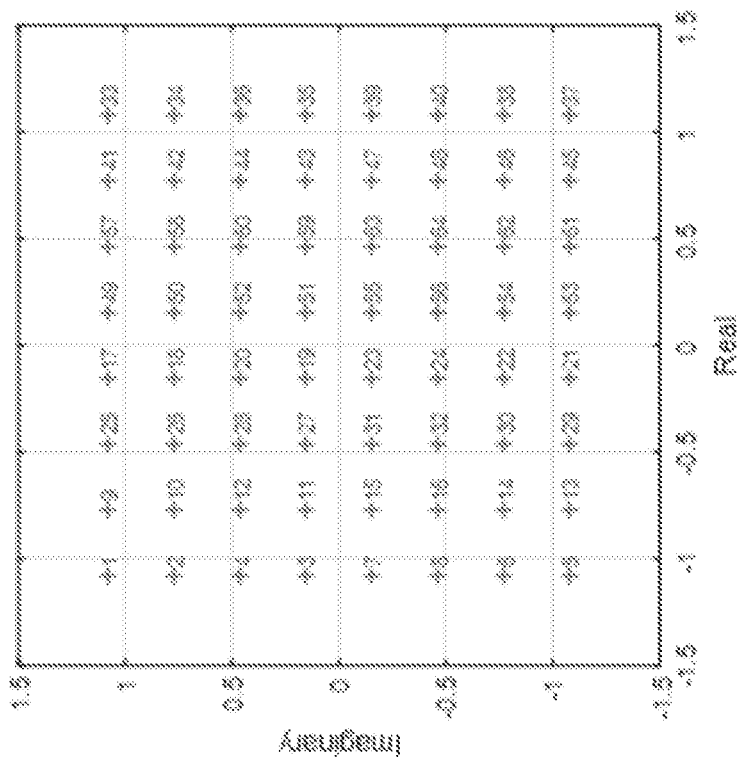
FIG. 14 illustrates example indices for 64 QAM.

| Sequence Type | i$_{left}$ | i$_{right}$ |
|---|---|---|
| OOB First | 23 32 12 20 49 35 | 40 13 17 40 30 27 |
| PAPR First | 64 23 64 5 1 42 | 51 19 60 55 51 55 |
| Leakage First | 20 42 45 3 34 61 | 53 8 11 26 60 55 | alphabet$_{64QAM}$(n)=normalization factor×(a(n)+$\sqrt{-1}$b(n))

where the normalization factor may normalize the energy of the constellation, and a(n) and b(n) may be given in Table 2, and the index mapping is shown in FIG. 14.

TABLE 2

Real and imaginary part of unnormalized 64QAM constellation.

| n | a(n) | b(n) |
|---|---|---|
| 1 | −7 | 7 |
| 2 | −7 | 5 |
| 3 | −7 | 1 |
| 4 | −7 | 3 |
| 5 | −7 | −7 |
| 6 | −7 | −5 |
| 7 | −7 | −1 |
| 8 | −7 | −3 |
| 9 | −5 | 7 |
| 10 | −5 | 5 |
| 11 | −5 | 1 |
| 12 | −5 | 3 |
| 13 | −5 | −7 |
| 14 | −5 | −5 |
| 15 | −5 | −1 |
| 16 | −5 | −3 |
| 17 | −1 | 7 |
| 18 | −1 | 5 |
| 19 | −1 | 1 |
| 20 | −1 | 3 |
| 21 | −1 | −7 |
| 22 | −1 | −5 |
| 23 | −1 | −1 |
| 24 | −1 | −3 |
| 25 | −3 | 7 |
| 26 | −3 | 5 |
| 27 | −3 | 1 |
| 28 | −3 | 3 |
| 29 | −3 | −7 |
| 30 | −3 | −5 |
| 31 | −3 | −1 |
| 32 | −3 | −3 |
| 33 | 7 | 7 |
| 34 | 7 | 5 |
| 35 | 7 | 1 |
| 36 | 7 | 3 |
| 37 | 7 | −7 |
| 38 | 7 | −5 |
| 39 | 7 | −1 |
| 40 | 7 | −3 |
| 41 | 5 | 7 |
| 42 | 5 | 5 |
| 43 | 5 | 1 |
| 44 | 5 | 3 |
| 45 | 5 | −7 |
| 46 | 5 | −5 |
| 47 | 5 | −1 |
| 48 | 5 | −3 |
| 49 | 1 | 7 |
| 50 | 1 | 5 |
| 51 | 1 | 1 |
| 52 | 1 | 3 |
| 53 | 1 | −7 |
| 54 | 1 | −5 |
| 55 | 1 | −1 |
| 56 | 1 | −3 |
| 57 | 3 | 7 |
| 58 | 3 | 5 |
| 59 | 3 | 1 |
| 60 | 3 | 3 |

TABLE 2-continued

Real and imaginary part of unnormalized 64QAM constellation.

| n | a(n) | b(n) |
|---|------|------|
| 61 | 3 | -7 |
| 62 | 3 | -5 |
| 63 | 3 | -1 |
| 64 | 3 | -3 |

In examples, sequences based on 256QAM may be provided as follows:

$$\text{sequence} = \{\text{alphabet}_{M-QAM}(i_{left}), 0, \text{alphabet}_{M-QAM}(i_{right})\}$$

Figure 15:
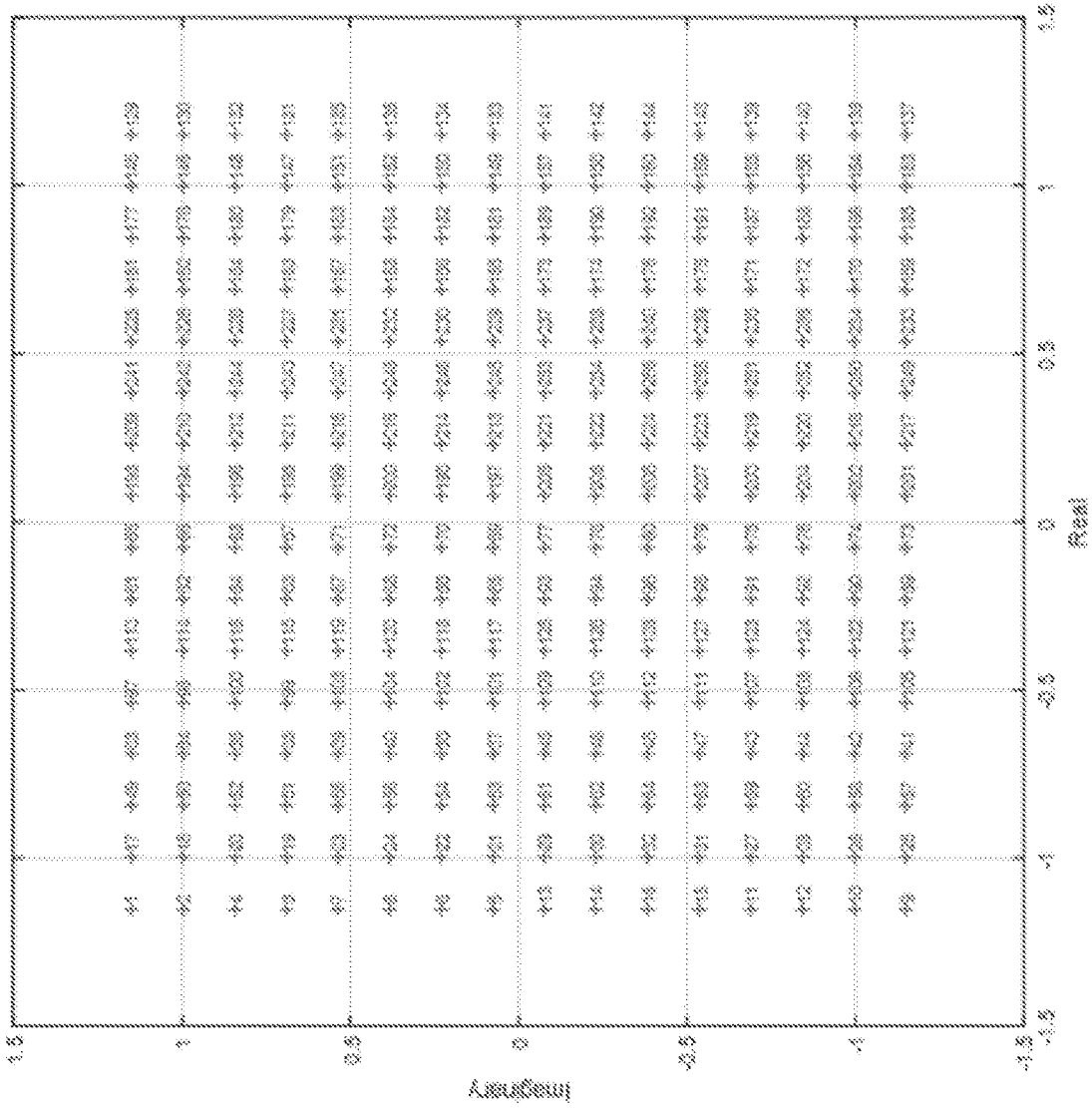
FIG. 15 illustrates example indices for 256 QAM.

| Sequence Type | Indices | |
|---|---|---|
| OOB First | 94 86 78 120 213 86 | 52 129 137 127 224 128 |
| PAPR First | 80 62 81 144 12 98 | 193 182 229 175 79 208 |
| Leakage First | 221 76 14 40 98 164 | 180 233 23 131 252 96 |

$$\text{alphabet}_{256QAM}(n) = \text{normalization factor} \times (a(n) + \sqrt{-1}b(n))$$

where the normalization factor may normalize the energy of the constellation, and a(n) and b(n) may be given in Table 3, and the index mapping is shown in FIG. 15.

TABLE 3

Real and imaginary part of unnormalized 256QAM constellation.

| n | a(n) | b(n) |
|---|------|------|
| 1 | -15 | 15 |
| 2 | -15 | 13 |
| 3 | -15 | 9 |
| 4 | -15 | 11 |
| 5 | -15 | 1 |
| 6 | -15 | 3 |
| 7 | -15 | 7 |
| 8 | -15 | 5 |
| 9 | -15 | -15 |
| 10 | -15 | -13 |
| 11 | -15 | -9 |
| 12 | -15 | -11 |
| 13 | -15 | -1 |
| 14 | -15 | -3 |
| 15 | -15 | -7 |
| 16 | -15 | -5 |
| 17 | -13 | 15 |
| 18 | -13 | 13 |
| 19 | -13 | 9 |
| 20 | -13 | 11 |
| 21 | -13 | 1 |
| 22 | -13 | 3 |
| 23 | -13 | 7 |
| 24 | -13 | 5 |
| 25 | -13 | -15 |
| 26 | -13 | -13 |
| 27 | -13 | -9 |
| 28 | -13 | -11 |
| 29 | -13 | -1 |
| 30 | -13 | -3 |
| 31 | -13 | -7 |
| 32 | -13 | -5 |
| 33 | -9 | 15 |
| 34 | -9 | 13 |
| 35 | -9 | 9 |
| 36 | -9 | 11 |
| 37 | -9 | 1 |
| 38 | -9 | 3 |
| 39 | -9 | 7 |
| 40 | -9 | 5 |

TABLE 3-continued

Real and imaginary part of unnormalized 256QAM constellation.

| n | a(n) | b(n) |
|---|------|------|
| 41 | -9 | -15 |
| 42 | -9 | -13 |
| 43 | -9 | -9 |
| 44 | -9 | -11 |
| 45 | -9 | -1 |
| 46 | -9 | -3 |
| 47 | -9 | -7 |
| 48 | -9 | -5 |
| 49 | -11 | 15 |
| 50 | -11 | 13 |
| 51 | -11 | 9 |
| 52 | -11 | 11 |
| 53 | -11 | 1 |
| 54 | -11 | 3 |
| 55 | -11 | 7 |
| 56 | -11 | 5 |
| 57 | -11 | -15 |
| 58 | -11 | -13 |
| 59 | -11 | -9 |
| 60 | -11 | -11 |
| 61 | -11 | -1 |
| 62 | -11 | -3 |
| 63 | -11 | -7 |
| 64 | -11 | -5 |
| 65 | -1 | 15 |
| 66 | -1 | 13 |
| 67 | -1 | 9 |
| 68 | -1 | 11 |
| 69 | -1 | 1 |
| 70 | -1 | 3 |
| 71 | -1 | 7 |
| 72 | -1 | 5 |
| 73 | -1 | -15 |
| 74 | -1 | -13 |
| 75 | -1 | -9 |
| 76 | -1 | -11 |
| 77 | -1 | -1 |
| 78 | -1 | -3 |
| 79 | -1 | -7 |
| 80 | -1 | -5 |
| 81 | -3 | 15 |
| 82 | -3 | 13 |
| 83 | -3 | 9 |
| 84 | -3 | 11 |
| 85 | -3 | 1 |
| 86 | -3 | 3 |
| 87 | -3 | 7 |
| 88 | -3 | 5 |
| 89 | -3 | -15 |
| 90 | -3 | -13 |
| 91 | -3 | -9 |
| 92 | -3 | -11 |
| 93 | -3 | -1 |
| 94 | -3 | -3 |
| 95 | -3 | -7 |
| 96 | -3 | -5 |
| 97 | -7 | 15 |
| 98 | -7 | 13 |
| 99 | -7 | 9 |
| 100 | -7 | 11 |
| 101 | -7 | 1 |
| 102 | -7 | 3 |
| 103 | -7 | 7 |
| 104 | -7 | 5 |
| 105 | -7 | -15 |
| 106 | -7 | -13 |
| 107 | -7 | -9 |
| 108 | -7 | -11 |
| 109 | -7 | -1 |
| 110 | -7 | -3 |
| 111 | -7 | -7 |
| 112 | -7 | -5 |
| 113 | -5 | 15 |
| 114 | -5 | 13 |
| 115 | -5 | 9 |
| 116 | -5 | 11 |

TABLE 3-continued

Real and imaginary part of unnormalized 256QAM constellation.

| n | a(n) | b(n) |
|---|---|---|
| 117 | −5 | 1 |
| 118 | −5 | 3 |
| 119 | −5 | 7 |
| 120 | −5 | 5 |
| 121 | −5 | −15 |
| 122 | −5 | −13 |
| 123 | −5 | −9 |
| 124 | −5 | −11 |
| 125 | −5 | −1 |
| 126 | −5 | −3 |
| 127 | −5 | −7 |
| 128 | −5 | −5 |
| 129 | 15 | 15 |
| 130 | 15 | 13 |
| 131 | 15 | 9 |
| 132 | 15 | 11 |
| 133 | 15 | 1 |
| 134 | 15 | 3 |
| 135 | 15 | 7 |
| 136 | 15 | 5 |
| 137 | 15 | −15 |
| 138 | 15 | −13 |
| 139 | 15 | −9 |
| 140 | 15 | −11 |
| 141 | 15 | −1 |
| 142 | 15 | −3 |
| 143 | 15 | −7 |
| 144 | 15 | −5 |
| 145 | 13 | 15 |
| 146 | 13 | 13 |
| 147 | 13 | 9 |
| 148 | 13 | 11 |
| 149 | 13 | 1 |
| 150 | 13 | 3 |
| 151 | 13 | 7 |
| 152 | 13 | 5 |
| 153 | 13 | −15 |
| 154 | 13 | −13 |
| 155 | 13 | −9 |
| 156 | 13 | −11 |
| 157 | 13 | −1 |
| 158 | 13 | −3 |
| 159 | 13 | −7 |
| 160 | 13 | −5 |
| 161 | 9 | 15 |
| 162 | 9 | 13 |
| 163 | 9 | 9 |
| 164 | 9 | 11 |
| 165 | 9 | 1 |
| 166 | 9 | 3 |
| 167 | 9 | 7 |
| 168 | 9 | 5 |
| 169 | 9 | −15 |
| 170 | 9 | −13 |
| 171 | 9 | −9 |
| 172 | 9 | −11 |
| 173 | 9 | −1 |
| 174 | 9 | −3 |
| 175 | 9 | −7 |
| 176 | 9 | −5 |
| 177 | 11 | 15 |
| 178 | 11 | 13 |
| 179 | 11 | 9 |
| 180 | 11 | 11 |
| 181 | 11 | 1 |
| 182 | 11 | 3 |
| 183 | 11 | 7 |
| 184 | 11 | 5 |
| 185 | 11 | −15 |
| 186 | 11 | −13 |
| 187 | 11 | −9 |
| 188 | 11 | −11 |
| 189 | 11 | −1 |
| 190 | 11 | −3 |
| 191 | 11 | −7 |
| 192 | 11 | −5 |
| 193 | 1 | 15 |
| 194 | 1 | 13 |
| 195 | 1 | 9 |
| 196 | 1 | 11 |
| 197 | 1 | 1 |
| 198 | 1 | 3 |
| 199 | 1 | 7 |
| 200 | 1 | 5 |
| 201 | 1 | −15 |
| 202 | 1 | −13 |
| 203 | 1 | −9 |
| 204 | 1 | −11 |
| 205 | 1 | −1 |
| 206 | 1 | −3 |
| 207 | 1 | −7 |
| 208 | 1 | −5 |
| 209 | 3 | 15 |
| 210 | 3 | 13 |
| 211 | 3 | 9 |
| 212 | 3 | 11 |
| 213 | 3 | 1 |
| 214 | 3 | 3 |
| 215 | 3 | 7 |
| 216 | 3 | 5 |
| 217 | 3 | −15 |
| 218 | 3 | −13 |
| 219 | 3 | −9 |
| 220 | 3 | −11 |
| 221 | 3 | −1 |
| 222 | 3 | −3 |
| 223 | 3 | −7 |
| 224 | 3 | −5 |
| 225 | 7 | 15 |
| 226 | 7 | 13 |
| 227 | 7 | 9 |
| 228 | 7 | 11 |
| 229 | 7 | 1 |
| 230 | 7 | 3 |
| 231 | 7 | 7 |
| 232 | 7 | 5 |
| 233 | 7 | −15 |
| 234 | 7 | −13 |
| 235 | 7 | −9 |
| 236 | 7 | −11 |
| 237 | 7 | −1 |
| 238 | 7 | −3 |
| 239 | 7 | −7 |
| 240 | 7 | −5 |
| 241 | 5 | 15 |
| 242 | 5 | 13 |
| 243 | 5 | 9 |
| 244 | 5 | 11 |
| 245 | 5 | 1 |
| 246 | 5 | 3 |
| 247 | 5 | 7 |
| 248 | 5 | 5 |
| 249 | 5 | −15 |
| 250 | 5 | −13 |
| 251 | 5 | −9 |
| 252 | 5 | −11 |
| 253 | 5 | −1 |
| 254 | 5 | −3 |
| 255 | 5 | −7 |
| 256 | 5 | −5 |

In examples, one or more (e.g., all) of the elements of the sequences described herein may be multiplied with a unit norm complex coefficient (e.g., to adjust the phase before frequency mapping).

Figure 16:
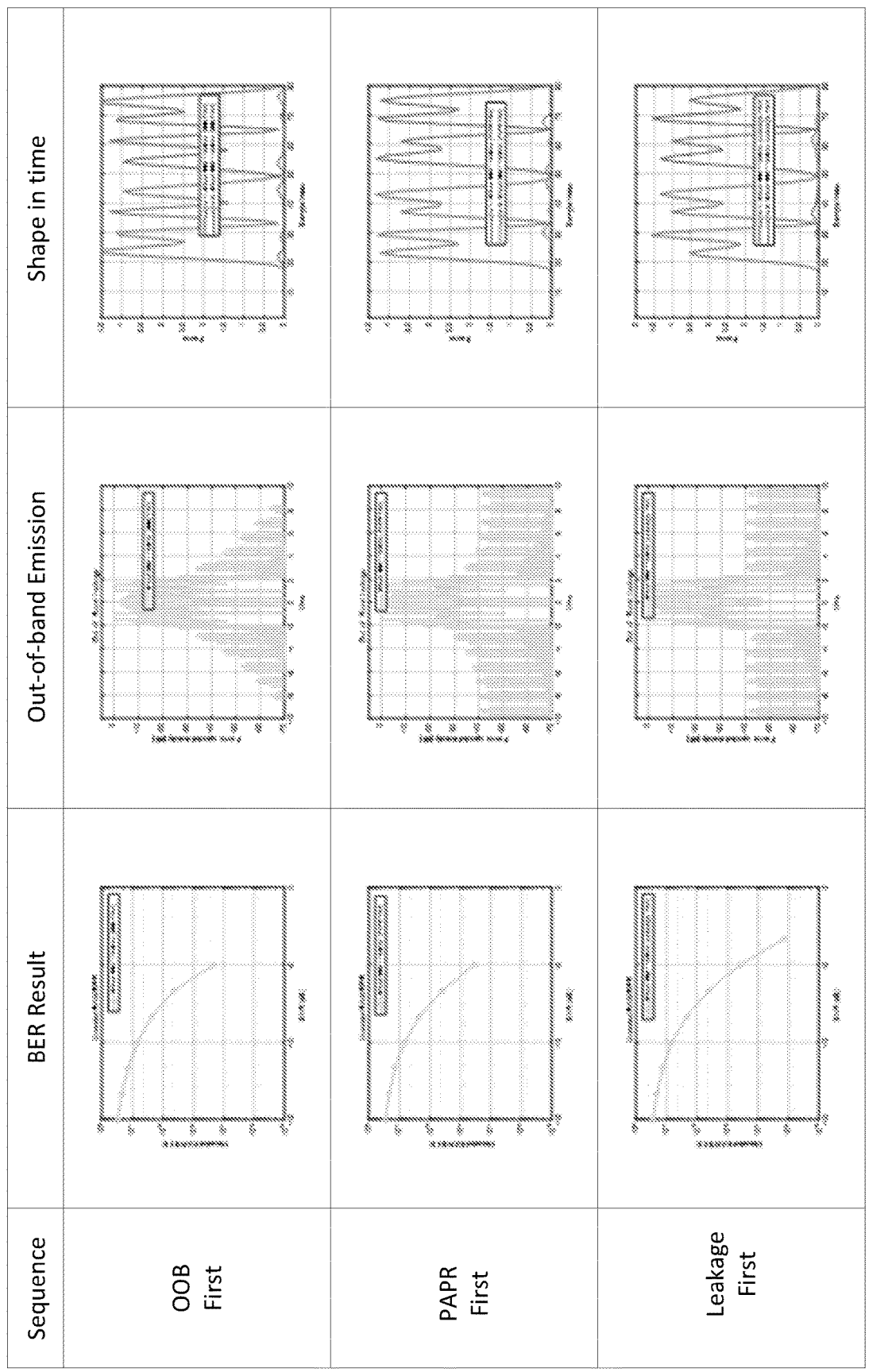
FIG. 16 illustrates examples of bit error rate (BER), OOB emissions, and corresponding time-domain shapes for bit 1 and bit 0 generated through direct OOK with 16 QAM constellation.
Figure 17:
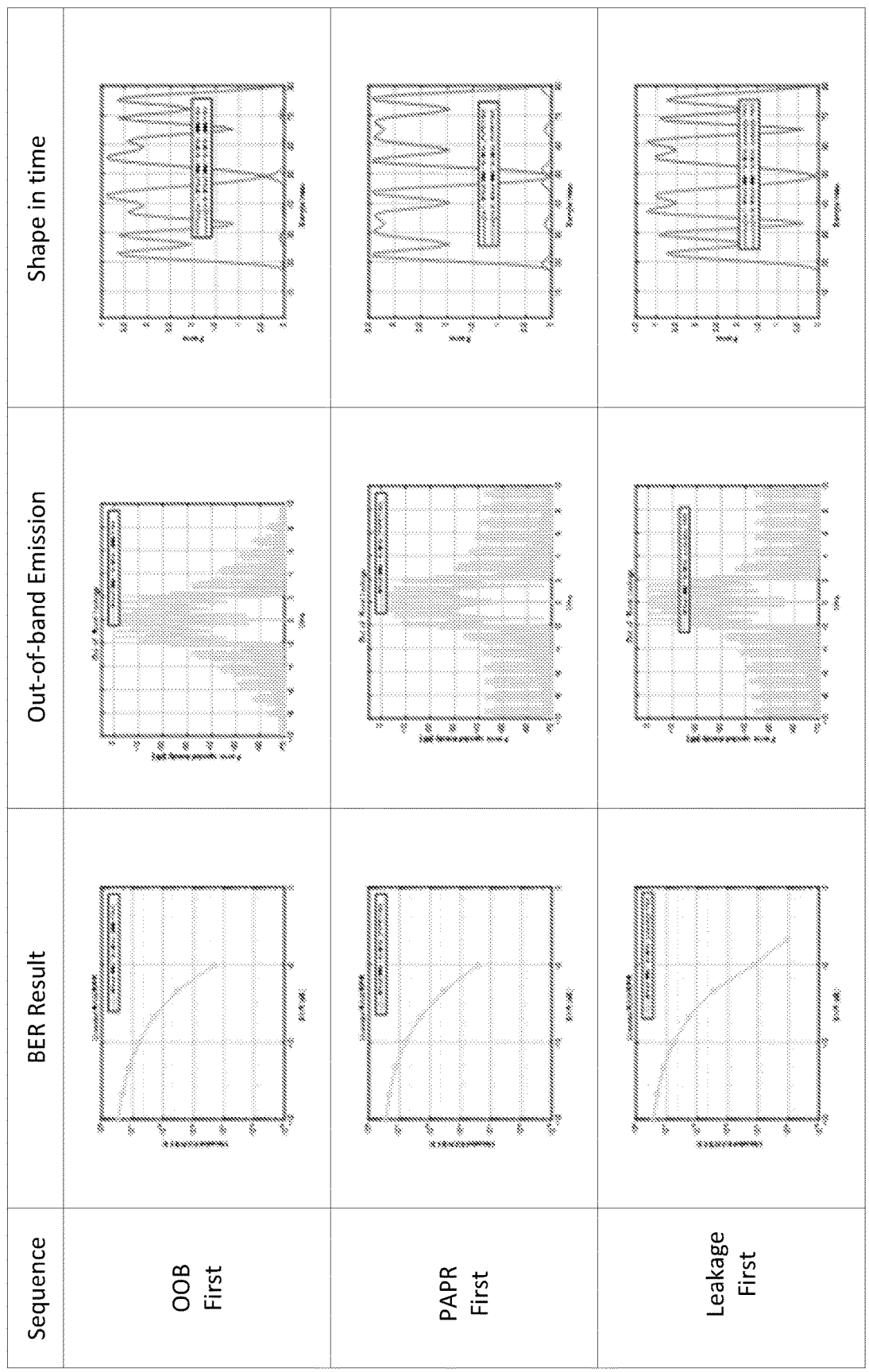
FIG. 17 illustrates examples of BER, OOB emissions, and corresponding time-domain shapes for bit 1 and bit 0 generated through direct OOK with 64 QAM constellation.
Figure 18:
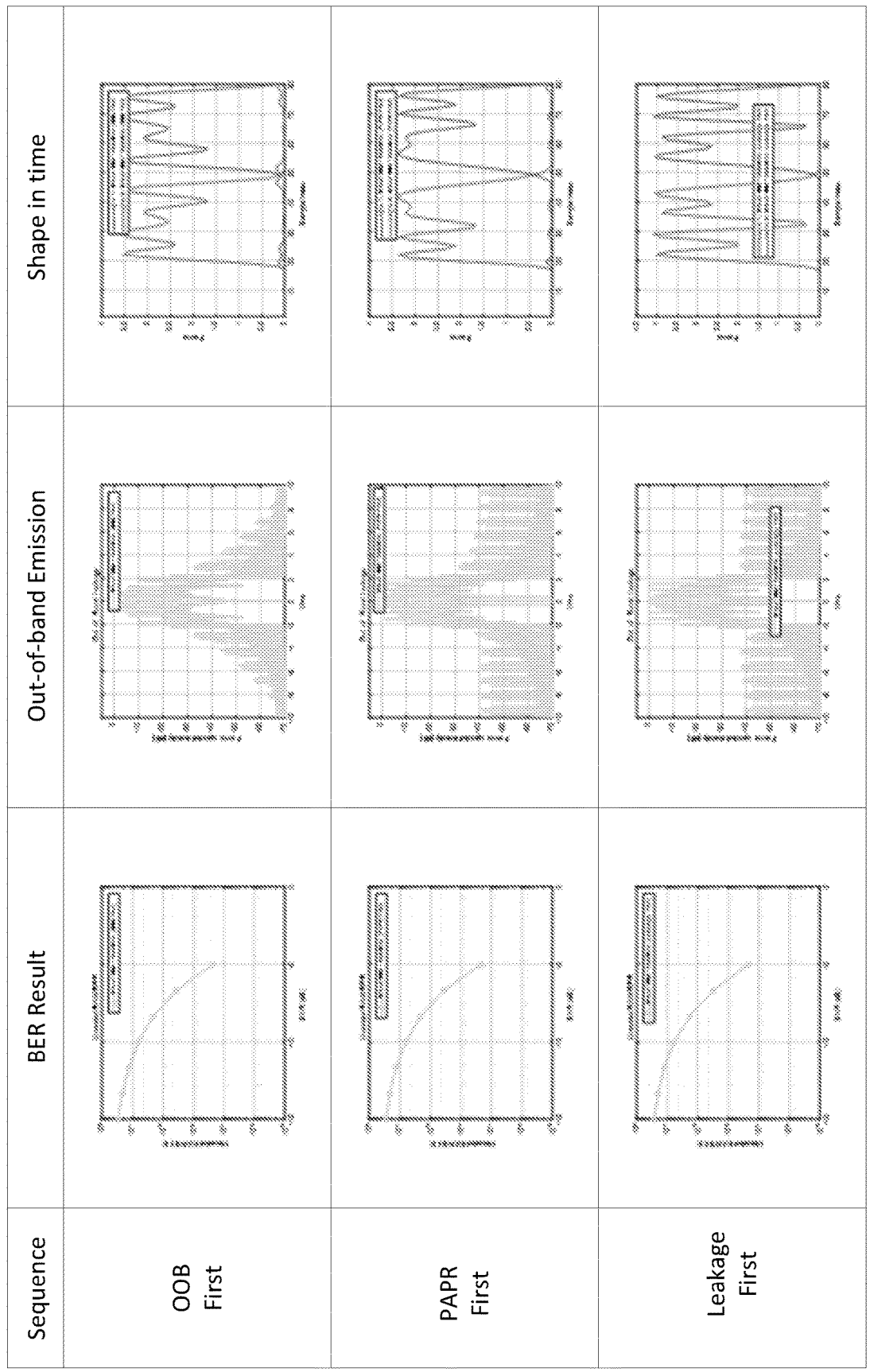
FIG. 18 illustrates examples of BER, OOB emissions, and corresponding time-domain shapes for bit 1 and bit 0 generated through direct OOK with 256 QAM constellation.

The performance results of the sequences may be shown in FIGS. 16-18. FIGS. 16-18 illustrate examples of bit error rate (BER), OOB emissions, and corresponding time-domain shapes for bit 1 and bit 0 generated through direct OOK with 16, 64, and 256 QAM constellation. In examples shown in FIGS. 16-18, the sequence for bit 1 may be the order-wise reserve of the sequence for bit 0.

In examples, the sequences may be complex numbers. For example, the angle and amplitudes of the $n^{th}$ element in the sequence may be provided in Table 4 and Table 5, respectively.

TABLE 4

Complex sequences for Manchester Coding (Angles).

| n | Sequence 1 | Sequence 2 | Sequence 3 | Sequence 4 |
|---|---|---|---|---|
| 1 | 22.500000 | 266.190452 | 180.000000 | 50.420946 |
| 2 | 315.000000 | 211.145959 | 90.000000 | 324.825664 |
| 3 | 247.500000 | 157.370394 | 360.000000 | 242.642334 |
| 4 | 180.000000 | 115.629100 | 270.000000 | 170.474257 |
| 5 | 112.500000 | 80.698546 | 180.000000 | 122.676992 |
| 6 | 45.000000 | 34.176419 | 90.000000 | 74.158113 |
| 7 | 337.500000 | 337.500000 | 360.000000 | 360.000000 |
| 8 | 0.000000 | 0.000000 | 0.000000 | 0.000000 |
| 9 | 22.500000 | 22.500000 | 0.000000 | 0.000000 |
| 10 | 315.000000 | 304.176419 | 270.000000 | 254.158113 |
| 11 | 247.500000 | 215.698546 | 180.000000 | 122.676992 |
| 12 | 180.000000 | 115.629100 | 90.000000 | 350.474257 |
| 13 | 112.500000 | 22.370394 | 0.000000 | 242.642334 |
| 14 | 45.000000 | 301.145959 | 270.000000 | 144.825664 |
| 15 | 337.500000 | 221.190452 | 180.000000 | 50.420946 |

TABLE 5

Complex sequences for Manchester Coding (Amplitudes).

| n | Sequence 1 | Sequence 2 | Sequence 3 | Sequence 4 |
|---|---|---|---|---|
| 1 | 0.116859 | 0.692338 | 0.030570 | 0.225429 |
| 2 | 0.375127 | 0.985698 | 0.170756 | 0.705446 |
| 3 | 0.783502 | 1.119034 | 0.508784 | 1.175441 |
| 4 | 1.220758 | 1.119034 | 1.023171 | 1.225126 |
| 5 | 1.479775 | 1.119034 | 1.489046 | 1.052330 |
| 6 | 1.367033 | 1.119034 | 1.556908 | 1.225126 |
| 7 | 0.826431 | 0.734927 | 1.011408 | 0.980102 |
| 8 | 0.000000 | 0.000000 | 0.000000 | 0.000000 |
| 9 | 0.826431 | 0.734927 | 1.011408 | 0.980102 |
| 10 | 1.367033 | 1.119034 | 1.556908 | 1.225126 |
| 11 | 1.479775 | 1.119034 | 1.489046 | 1.052330 |
| 12 | 1.220758 | 1.119034 | 1.023171 | 1.225126 |
| 13 | 0.783502 | 1.119034 | 0.508784 | 1.175441 |
| 14 | 0.375127 | 0.985698 | 0.170756 | 0.705446 |
| 15 | 0.116859 | 0.692338 | 0.030570 | 0.225429 |

Figure 19:
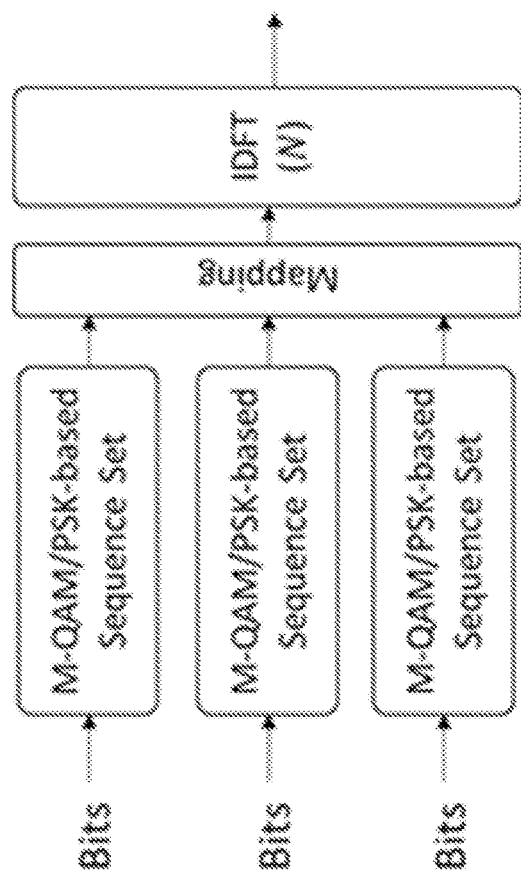
FIG. 19 illustrates an example multiband direct OOK.

In examples, the sequences designed for single band transmission may be mapped (e.g., simultaneously mapped) to different groups of subcarriers to obtain orthogonal multi-band transmission. For example, to achieve three band transmission, first, second, and the third sequence of length 13 may be [−6, −5, . . . , 6]+20, [−6, −5, . . . , 6], and [−6, −5, . . . , 6]−20 tones (e.g., when IDFT size is 64) as shown in FIG. 19. FIG. 19 illustrates an example multi-band direct OOK transmission including data for multiple stations. For example, the first band may include the data for user 1, the second band may include the data for user 2, and the third band may include the data for user 3. The frequency hopping may be used (e.g., to increase the reliability). For example, user 1's data may be in the first band for the first OOK symbol, the second band for the second OOK symbol, and the third band for the third OOK symbol.

Figure 20:
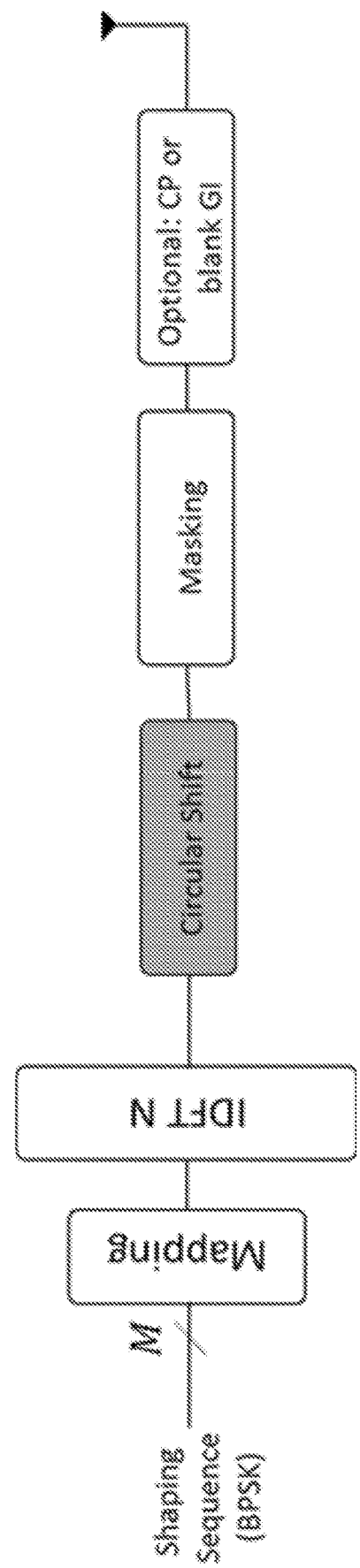
FIG. 20 illustrates an example diagram of OOK symbol generation with masking.

A cyclic-shifted signal may be used for a masking-based OOK approach. FIG. 20 illustrates an example diagram of OOK symbol generation with masking.

Figure 21:
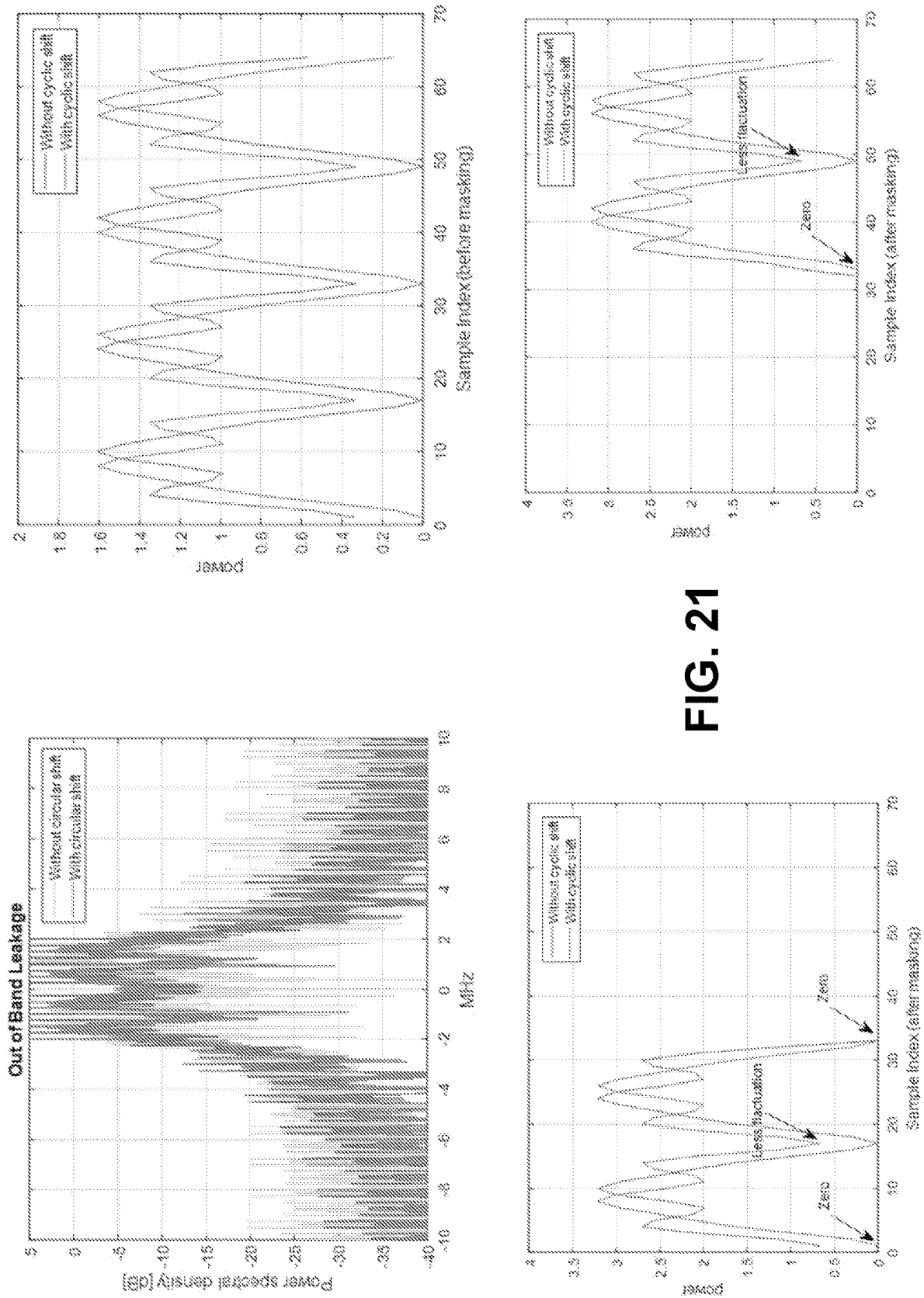
FIG. 21 illustrate examples results with and without cycle shift.

In examples, a shaping sequence (e.g., with binary phase shift keying (BPSK) alphabet and some constant phase rotation on each element) may be mapped to the input of IDFT in frequency by allowing DC tones. The output of IDFT may be shifted (e.g., circularly shifted) before masking operation (e.g., to decrease the out-of-band emission (OOBE) of the signal). For example, after mapping, the shaping sequence s1 may be defined (e.g., or equivalent sequence which gives the same amplitude (e.g., shape) in time) as $$s1=p*[1,1,1,-1,-1,-1,0,-1,1,-1,-1,1,-1]';$$

where p may be unit norm complex number (e.g., p=1 or p=$\sqrt{2}/2+\sqrt{2}/2i$), and the output of IDFT may be shifted by 16 or 48 samples. The resulting OOK waveforms with and without cyclic shift may be shown in FIG. 21. The one with cyclic shift may improve the fluctuation in time and may yield smoother ramp up and ramp down shapes. The OOBE characteristics may be improved and may reduce the required filter length or order at transmitter (TX) and/or receiver (RX).

In examples, the corresponding sequence in frequency may be used. For example, the corresponding sequences that give the cyclic shifted signal for 16 and 48 in time may be obtained as $$s1C\_alternative16=s1'.*exp(1i*2*pi*16/64*[0:12]')$$

and $$s1C\_alternative48=s1'.*exp(1i*2*pi*48/64*[0:12]')$$

respectively. For these sequences, a cyclic shift operation may not be utilized.

Figure 22:
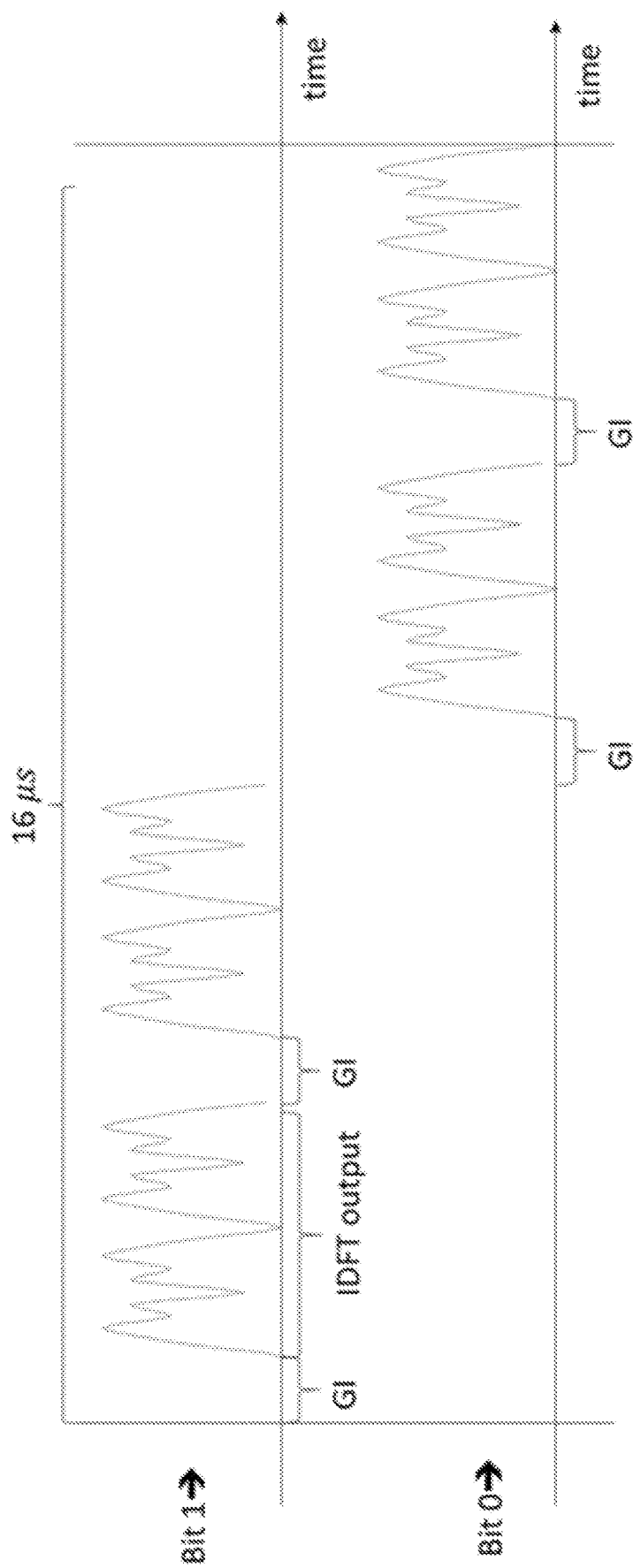
FIG. 22 illustrates an example low rate waveform with low OOB emission.

In examples, there may be one or more (e.g., several) data rate options, e.g., high data rate and low data rate to transfer the OOK symbols, e.g., with Manchester coding. The high data rate option may be obtained by Direct OOK approach. The low data rate option may be obtained by concatenating the output of the IDFT without masking. To mitigate OOB emission, the guard interval (GI) part may be omitted for the cyclic shifted signal for low data rate option as exemplified in FIG. 22. As shown in FIG. 22, an "on" duration of an OOK symbol may include two OFDM symbols, which may be generated through s1C_alternative16 or s1C_alternative48 and may include a blank guard interval (e.g., to represent bit 1 and bit 0).

Waking up multiple users (e.g., waking up multiple users simultaneously) may be done by a multi-user wake-up (MU wakeup) signal sent from the transmitter. A MU wakeup signal transmission may be broadcast to multiple users. A MU wakeup signal transmission may be multi-cast to a sub-set of the users. A MU wakeup signal transmission may be unicast to multiple users (e.g., with physical layer multiplexing using, for example, a common legacy preamble).

Sequence-based TDMed OOK symbols for MU-WUR may be described herein. Multiple WUR receivers may be supported using one or more of the following. The shaped symbols (e.g., OOK symbols with or without Manchester coding) may be multiplexed. The shaped symbols may be multiplexed within one OFDM symbol duration in time. The shaped symbols (e.g., OOK symbols with or without Manchester coding) may occupy a set of subcarriers in frequency. OOK symbols may be presented as an example of shaped symbols. Other symbols, such as K-ary symbols (e.g., as seen in FIG. 8, K different shaped signals), may be used for shaped symbols.

Figure 23:
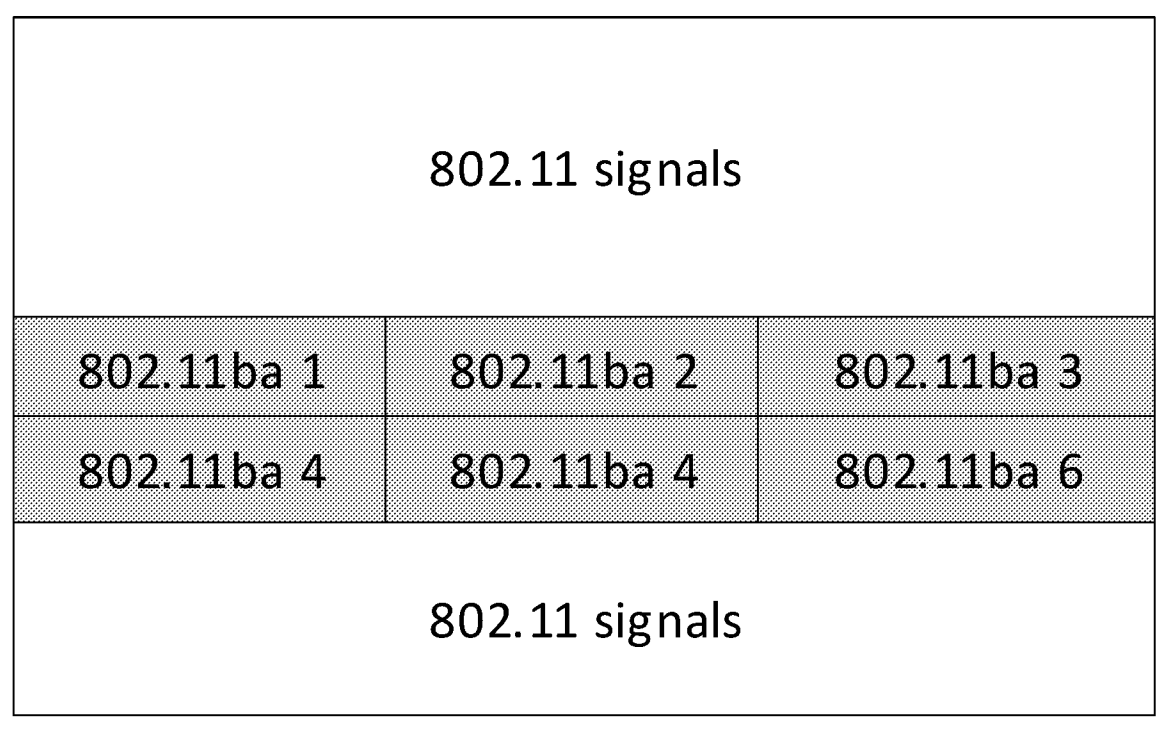

Multiplexing in frequency between shaped symbols and QAM symbols for other radios may be achieved. A specific set of subcarriers may be used for shaped subcarriers. For example, QAM symbols may be for 802.11ax STAs. The shape signal may be for multiple of 802.11ba STAs. FIG. 23 illustrates example MU WUR in coexistence with other 802.11 symbols.

For each 802.11ba STA, a sequence which corresponds to a specific shape at a specific time may be assigned. One or more of the following may apply. The summation of the corresponding shapes in time (e.g., for different sequences) may keep the original shape (e.g., or similar shape) in a certain duration of the OFDM symbol. An 802.11ba receiver may detect the shape by looking a specific duration in time. A combination of DFT-based sequences may be mapped to certain subcarriers of OFDM symbols to generate OOK symbols multiplexed for different users. Generated OOK symbols from different radios may fall in the same frequency subcarriers.

Figure 24:
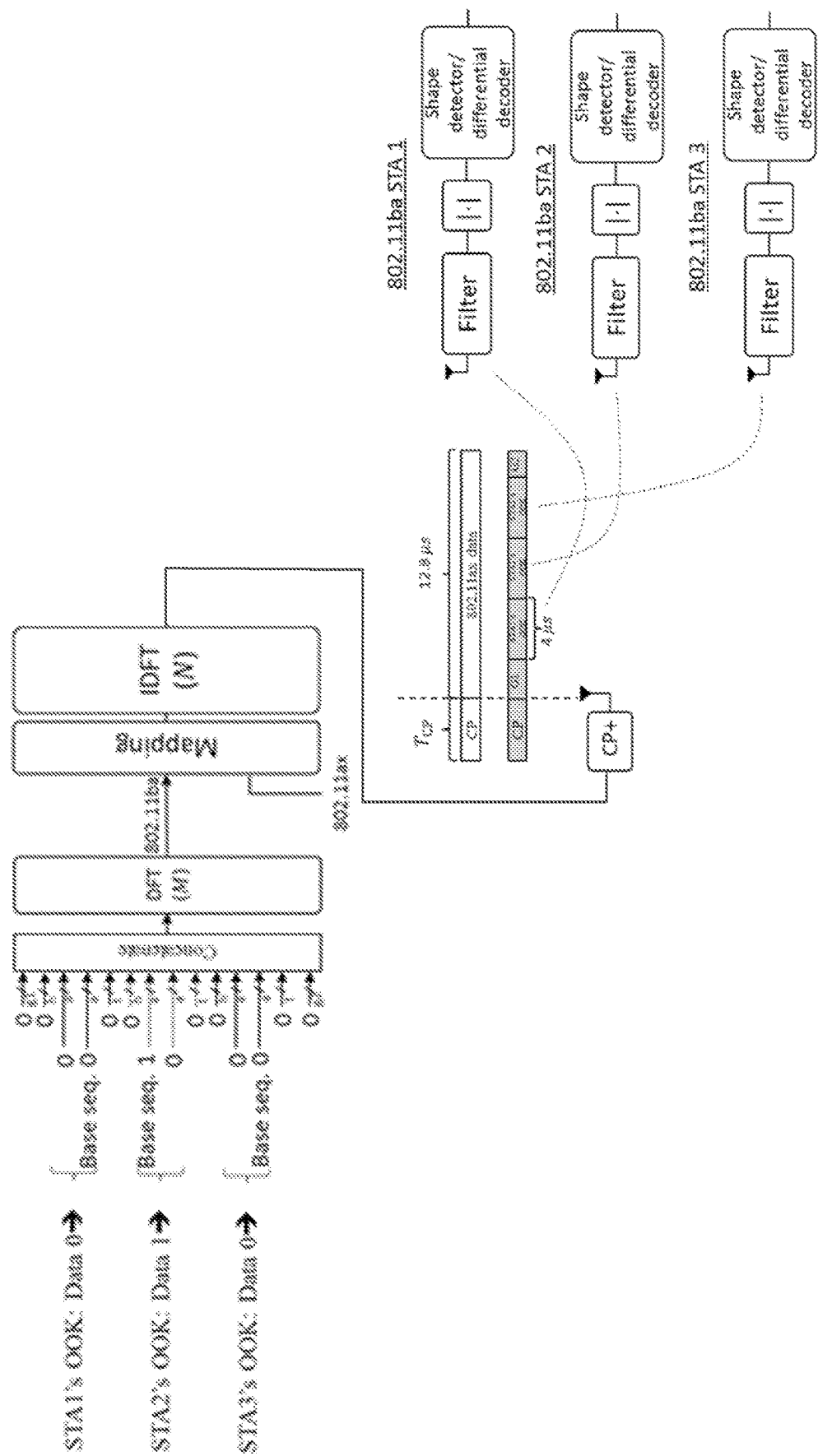
FIG. 24 illustrates an example of multiplexing three OOK symbols for three different STAs with DFT-based time division multiplexed OOK symbols.

For example, FIG. 24 illustrates an example of multiplexing three OOK symbols for three different STAs with DFT-based time division multiplexed OOK symbols. In FIG. 24, three OOK symbols for different 802.11ba STAs may be multiplexed with a DFT operation. As seen in FIG. 24, OOK symbols may be generated by sharing different inputs of a DFT (e.g., a DFT of size of M).

Figure 25:
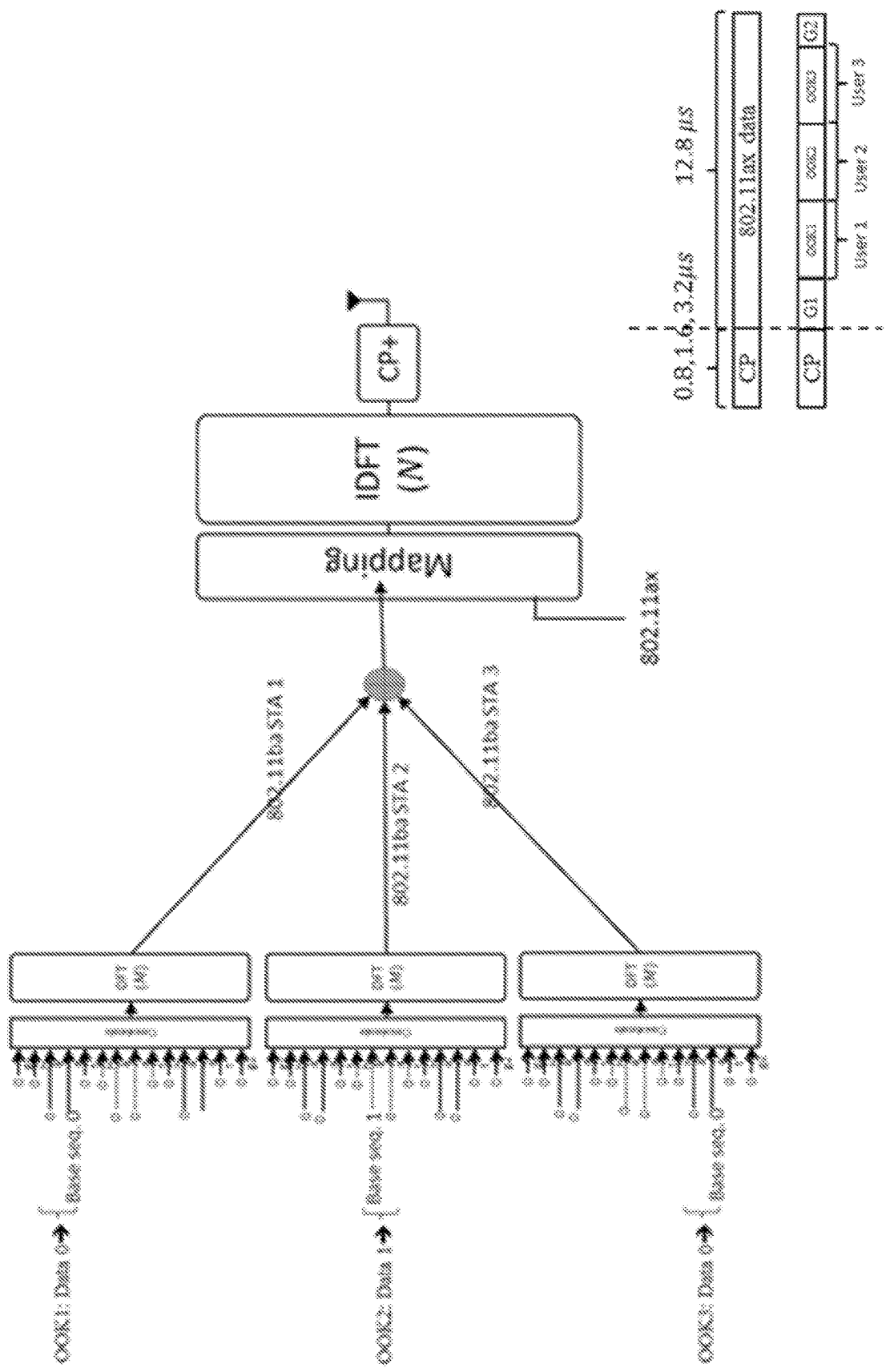
FIG. 25 illustrates an example of multiplexing three OOK symbols for three different STAs with DFT-based sequences.

FIG. 25 illustrates an example of multiplexing three OOK symbols for three different STAs with DFT-based sequences. For example, sequences may be generated as shown in FIG. 25. The sequences may generate different shapes at different time instants. The generated sequences may be summed in frequency as show in FIG. 25.

In a multi-user environment, each OOK symbol may have independent OOK symbol structures. For example, for one STA, OOK symbol may include a waveform coding method, such as Manchester coding. For other STA, OOK symbol may not include a waveform coding.

The scheduling information and/or the settings for OOK symbols may be signaled prior to the transmission. The scheduling information and/or the settings for OOK symbols may be set up prior to the transmission. Scheduling information related to OOK symbols may be transmitted to the primary radio (e.g., over control channels via a MAC frame).

Figure 26:
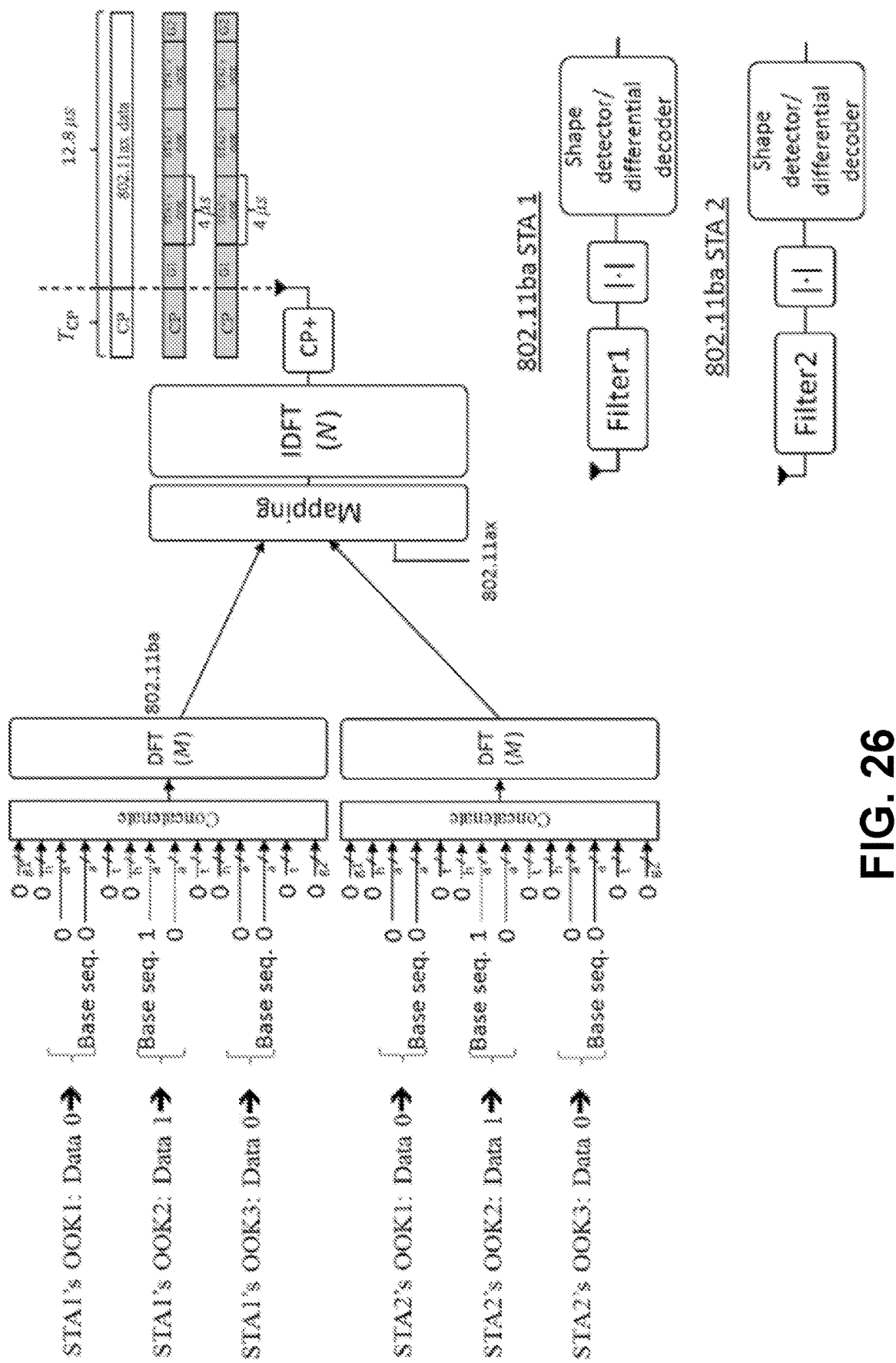
FIG. 26 illustrates an example of multiplexing three OOK symbols for two different STAs in frequency with DFT-based sequences.

Sequence-based FDMed OOK symbols for MU-WUR may be described herein. A sequence, which may generate multiple shaped signals in the time domain, may be multiplexed in the frequency domain to support MU-WUR and/or other user data (e.g., 802.11ax). The WUR signals and/or other users' signals may become orthogonal to each other. WUR receivers may use different filters to get their OOK symbols located in the corresponding band. FIG. 26 illustrates an example of multiplexing three OOK symbols for two different STAs in frequency with DFT-based sequences. In FIG. 26, two different WUR users may receive three shaped signals (e.g., OOK symbols) generated via DFT-based sequences. The sequences for each WUR and 802.11ax data symbols may be mapped to different subcarriers.

Figure 27:
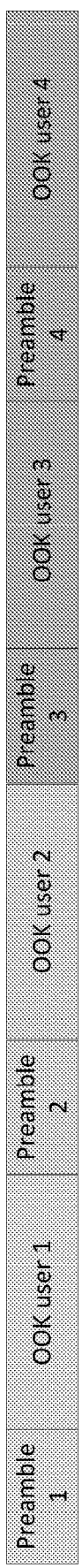
FIG. 27 illustrates example MU-WUR signal 1 with time-domain multiplexing.

MU-WUR frame structures may be described herein. Multiple unicast wakeup signals may be described herein. For a MU-wakeup signal, the data and preamble information for each user may be concatenated in time as shown in FIG. 27 and as described herein (e.g., sequence-based TDMed OOK symbols for MU-WUR). For example, FIG. 27 illustrates an example MU-WUR signal 1 with time-domain multiplexing. Each WUR receiver may search (e.g., search continuously) for its WUR signal carried in the preamble (e.g., WUR receiver may detect the information on transmission). If the duration of the signal is indicated in the preamble, the WUR receiver may switch off for the signal duration if it identifies that a specific signal is not directed at the WUR receiver.

Figure 28:
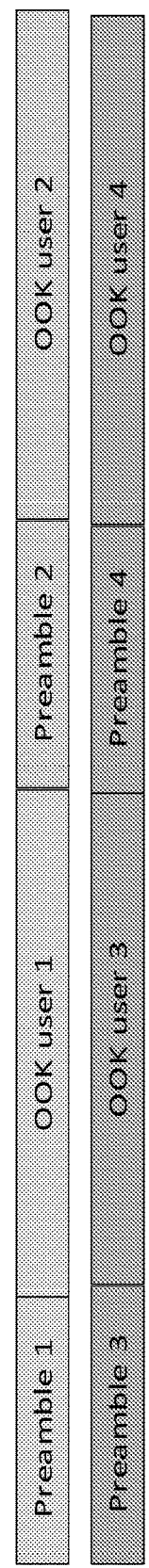
FIG. 28 illustrates example MU-WUR signal 2 with frequency-domain multiplexing.

The data and preamble information for each user may be concatenated in time as shown in FIG. 28 and described herein (e.g., sequence-based FDMed OOK symbols for MU-WUR). The preamble information may be concatenated in time with data for a specific user. One or more users may be transmitted in parallel frequencies. For example, FIG. 28 illustrates an example MU-WUR signal 2 with frequency-domain multiplexing. For example, as seen in FIG. 28, information for user 1 and user 2 may use a first frequency, and information for user 3 and user 4 may use a second frequency. In examples, each WUR receiver may search (e.g., search continuously) for its WUR signal, which may be carried in the preamble (e.g., even though the WUR receiver detects the information on the transmission within a predetermined transmission band). One or more of the following may apply. The transmission band may be fixed and may be communicated to the STA during the WUR frame setup exchange. The transmission band may be changed. The STA may scan multiple channels (e.g., scan multiple channels simultaneously) during its search. A WU signal may be transmitted on one band at a time. The scanning circuitry and decoding circuitry may be separated. The decoding circuitry may be activated upon identification of a valid wake up signal. Multiple scanning circuitry may be implemented to enable the scanning of multiple channels. A single scanning circuit with a filter (e.g., wideband band pass filter) in the front end may be used.

Figure 29:
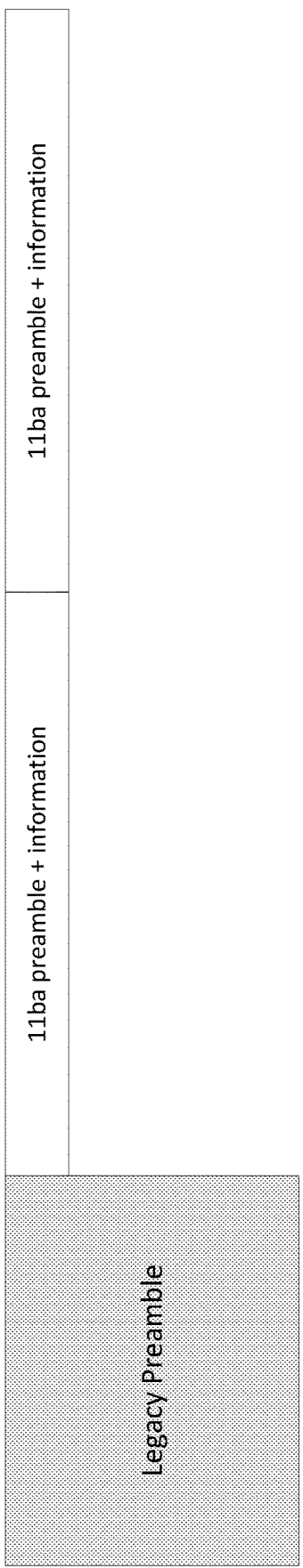
FIG. 29 illustrates example MU-WUR signal 4 with time-domain multiplexing.

For the full WU signal, a common preamble (e.g., a legacy preamble, which may be detectable and/or decodable by legacy 802.11 devices) may be transmitted for protection from other radios in the network. The WUR packets (e.g., which may include WUR preamble and/or payload) may be multiplexed in time or frequency. For example, FIG. 29 illustrates example MU-WUR signal 4 with multiplexing in time-domain.

Figure 30:
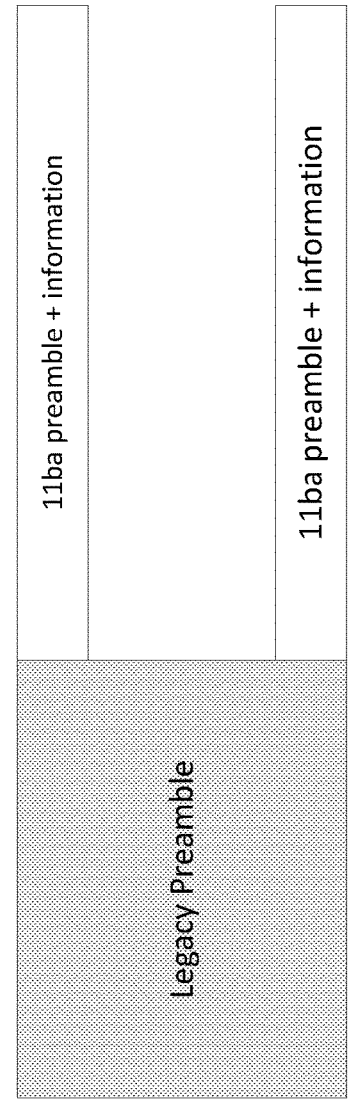
FIG. 30 illustrates example MU-WUR signal 4 with frequency-domain multiplexing.

For MU-WUR, the data and preamble information for each user may be concatenated in time as shown in FIG. 30. The preamble information may be concatenated in time with a specific user. One or more users may be transmitted in parallel frequencies. For example, FIG. 30 illustrates an example MU-WUR signal (e.g., MU-WUR signal 1) with frequency-domain multiplexing, which may be transmitted to a user (e.g., a single user, for example user 1 in FIG. 27). A common preamble may be transmitted (e.g., transmitted first), and the signals (e.g., which may include preamble and/or payload) may be multiplexed in frequency.

Figure 31:
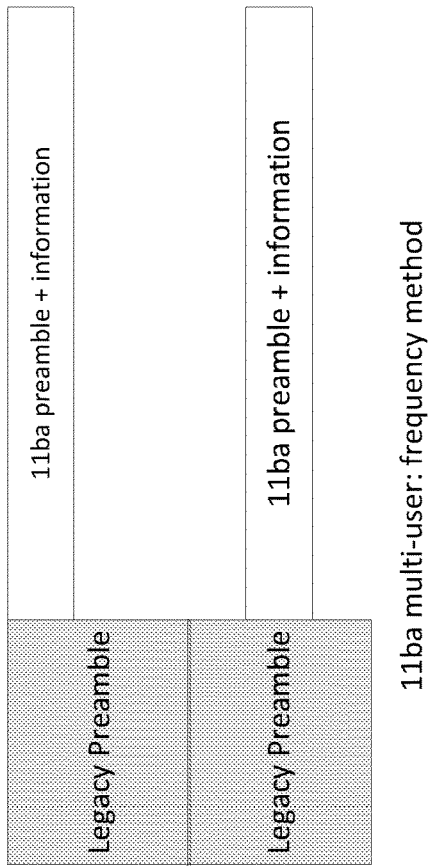
FIG. 31 illustrates example MU-WUR signal 2 with frequency-domain multiplexing.

A preamble (e.g., a common preamble for each WUR receiver) may be transmitted with a WUR packet to a WUR receiver. The preambles and the WUR packets (e.g., which may include a WUR preamble and/or payload) may be multiplexed in frequency, e.g., for the multi-user case where a common preamble is sent for each WUR receiver. An example with two preambles, which may be the same (e.g., legacy preamble of 802.11), is shown in FIG. 31. As seen in FIG. 31, the common preamble (e.g., legacy preamble of 802.11) may protect the WUR packet from interference (e.g., interference from other transmitters, such as 802.11 stations, 802.11 transmitters and/or 802.11 radios). For example, FIG. 31 illustrates example MU-WUR signal 2 with frequency-domain multiplexing. As seen in FIG. 31, the WUR packet may have a smaller bandwidth than the common preamble (e.g., the legacy preamble of 802.11). As seen in FIG. 31, the WUR packets may occupy a portion of the common preamble bandwidth that are different from or non-coextensive with each other.

Figure 32:
FIG. 32 illustrates example MU-WUR signal 3 with time-domain multiplexing.

Grouped WU signals may be described herein. A MU preamble indicator with an indication of the total length of the signal may be sent. For example, FIG. 32 illustrates example MU-WUR signal 3 with time-domain multiplexing. The signals may be unicast and may be grouped with a multi-user preamble. The MU preamble may be sent to enable the WUR STA to know the length of time for scanning preamble information.

Figure 33:
FIG. 33 illustrates example MU-WUR signal 4 in common WUR signal.
Figure 34:
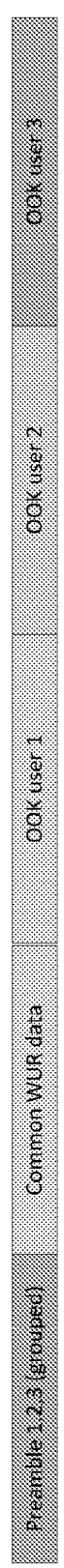
FIG. 34 illustrates example MU-WUR signal 5 in common and STA specific WUR signal.
Figure 35:
FIG. 35 illustrates example MU-WUR signal 6 in STA specific WUR signal.

A grouped MU preamble with information on the STAs may be transmitted to enable STAs in the group to identify that a WUR signal is being transmitted and to decode the information meant for the group. The OOK symbols may be a WUR signal that has information for some or all the addressed STAs (e.g., FIG. 33). For example, FIG. 33 illustrates example MU-WUR signal 4 in common WUR signal. The OOK symbols may be a WUR signal that has common information for some or all users and separate symbols that map to each user (e.g., FIG. 34). For example, FIG. 34 illustrates example MU-WUR signal 5 in common and STA specific WUR signal. The OOK symbols may be a WUR signal that has a common preamble but separate information for each of the addressed STAs (e.g., FIG. 35). For example, FIG. 35 illustrates example MU-WUR signal 6 in STA specific WUR signal. The separate symbols may or may not have OOK preambles.

Although features and elements may be described above in particular combinations or orders, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A transmit device comprising:
   a transmitter configured to transmit a common preamble using a first frequency range;
   the transmitter configured to transmit a first wake up radio (WUR) packet to a first WUR receiver after the common preamble, using the first frequency range, wherein a bandwidth associated with the first WUR packet is smaller than a bandwidth associated with the common preamble;
   the transmitter configured to transmit the common preamble using a second frequency range; and
   the transmitter configured to transmit a second WUR packet to a second WUR receiver after the common preamble, using the second frequency range, wherein a bandwidth associated with the second WUR packet is smaller than a bandwidth associated with the common preamble, and wherein a frequency range associated with the second WUR packet is different than a frequency range associated with the first WUR packet.

2. The transmit device of claim 1, wherein the transmitter is configured to transmit a quadrature amplitude modulation (QAM) symbol, after the common preamble, wherein the QAM symbol is frequency division multiplexed with the first WUR packet.

3. The transmit device of claim 1, wherein the common preamble protects WUR packets from interference caused by other transmit devices.

4. The transmit device of claim 1, wherein the first WUR packet comprises an 802.11ba preamble and WUR information.

5. The transmit device of claim 1, wherein a WUR signal associated with the first WUR packet is generated via a sequence, wherein the sequence is mapped to a set of subcarriers associated with an orthogonal frequency division multiplexed (OFDM) symbol.

6. The transmit device of claim 1, wherein a portion of the first frequency range used to transmit the first WUR packet is centered within the first frequency range.

7. A method comprising:
   transmitting a common preamble using a first frequency range;
   transmitting a first wake up radio (WUR) packet to a first WUR receiver after the common preamble, using the first frequency range, wherein a bandwidth associated with the first WUR packet is smaller than a bandwidth associated with the common preamble;
   transmitting the common preamble using a second frequency range; and
   transmitting a second WUR packet to a second WUR receiver after the common preamble, using the second frequency range, wherein a bandwidth associated with the second WUR packet is smaller than a bandwidth associated with the common preamble, and wherein a frequency range associated with the second WUR packet is different than a frequency range associated with the first WUR packet.

8. The method of claim 7, further comprising transmitting a quadrature amplitude modulation (QAM) symbol, after the common preamble, wherein the QAM symbol is frequency division multiplexed with the first WUR packet.

9. The method of claim 7, wherein the common preamble protects WUR packets from interference caused by other transmit devices.

10. The method of claim 7, wherein the first WUR packet comprises an 802.11ba preamble and WUR information.

11. The method of claim 7, wherein a WUR signal associated with the first WUR packet is generated via a sequence, wherein the sequence is mapped to a set of subcarriers associated with an orthogonal frequency division multiplexed (OFDM) symbol.

12. The method of claim 7, wherein a portion of the first frequency range used to transmit the first WUR packet is centered within the first frequency range.

* * * * *